(12) United States Patent
Brandt et al.

(10) Patent No.: US 9,413,477 B2
(45) Date of Patent: Aug. 9, 2016

(54) SCREEN DETECTOR

(71) Applicant: Microsoft Corporation, Redmond, WA (US)

(72) Inventors: Achiezer Brandt, San Mateo, CA (US); Eran Borenstein, Los Gatos, CA (US); Eitan Sharon, Palo Alto, CA (US); Mehmet Tek, Santa Clara, CA (US); Sunaad Nataraju, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/306,942

(22) Filed: Jun. 17, 2014

(65) Prior Publication Data
US 2014/0293087 A1  Oct. 2, 2014

Related U.S. Application Data

(63) Continuation-in-part of application No. 14/260,171, filed on Apr. 23, 2014, and a continuation-in-part of application No. 13/104,793, filed on May 10, 2011.

(60) Provisional application No. 61/333,093, filed on May 10, 2010, provisional application No. 61/430,445, filed on Jan. 6, 2011.

(51) Int. Cl.
G06K 9/00 (2006.01)
H04H 60/59 (2008.01)
(Continued)

(52) U.S. Cl.
CPC .......... H04H 60/59 (2013.01); G06K 9/00765 (2013.01); G06K 9/4604 (2013.01); G06K 9/4652 (2013.01); H04H 60/37 (2013.01); H04N 5/23267 (2013.01); H04H 2201/90 (2013.01)

(58) Field of Classification Search
None
See application file for complete search history.

(56) References Cited

U.S. PATENT DOCUMENTS 4,677,466 A    6/1987  Lert et al.
4,739,398 A    4/1988  Thomas et al.
(Continued)

FOREIGN PATENT DOCUMENTS

EP         1377036 A2    1/2004
WO    WO2009/070508 A1   6/2009
(Continued)

OTHER PUBLICATIONS

U.S. Appl. No. 14/260,171, filed Apr. 23, 2014 56 Pages.
(Continued)

Primary Examiner — Chan Park
Assistant Examiner — Iman K Kholdebarin
(74) Attorney, Agent, or Firm — Aaron Chatterjee; Kate Drakos; Micky Minhas

(57) ABSTRACT

Technology described herein provides techniques for screen detection. This could be a dynamic screen, such as a display screen of an electronic device, or a static screen such as a street sign. In one aspect, a screen is detected in frames of image data. An active image and/or an average color image may be formed based on frames of image data. A set of lines that are candidate for boundaries of a screen are identified in the frames. The active image and/or an average color is integrated on both sides of each line in the set of lines to form integration results. A set of screen candidates are formed based on the integration results. Screens in the screen candidates are scored according to a criterion. One or top few of the screens in the set of screen candidates is selected based on the scoring.

20 Claims, 17 Drawing Sheets

(51) Int. Cl.
*H04H 60/37* (2008.01)
*H04N 5/232* (2006.01)
*G06K 9/46* (2006.01)

(56) References Cited

U.S. PATENT DOCUMENTS

| | | | |
|---|---|---|---|
| 5,276,790 A * | 1/1994 | Lo | G06K 15/02 345/170 |
| 5,546,107 A | 8/1996 | Deretsky et al. | |
| 5,557,339 A | 9/1996 | Dadourian | |
| 5,574,764 A | 11/1996 | Granfors et al. | |
| 5,838,838 A | 11/1998 | Overton | |
| 5,937,101 A * | 8/1999 | Jeon | H04N 19/527 358/426.04 |
| 5,982,951 A | 11/1999 | Katayama et al. | |
| 6,208,765 B1 | 3/2001 | Bergen | |
| 6,400,844 B1 | 6/2002 | Fan et al. | |
| 6,404,925 B1 | 6/2002 | Foote et al. | |
| 6,674,904 B1 | 1/2004 | McQueen | |
| 6,690,838 B2 * | 2/2004 | Zhou | G06T 9/00 382/199 |
| 6,771,793 B1 * | 8/2004 | Yamada | G06T 5/002 382/240 |
| 6,774,917 B1 | 8/2004 | Foote et al. | |
| 7,055,958 B2 | 6/2006 | Tajima | |
| 7,098,914 B1 | 8/2006 | Katayama et al. | |
| 7,120,195 B2 | 10/2006 | Patti et al. | |
| 7,124,365 B2 | 10/2006 | Cavallerano et al. | |
| 7,227,893 B1 * | 6/2007 | Srinivasa | G06K 9/00771 348/155 |
| 7,349,922 B2 | 3/2008 | Brandt et al. | |
| 7,400,680 B2 | 7/2008 | Jiang | |
| 7,424,672 B2 | 9/2008 | Simske et al. | |
| 7,589,729 B2 * | 9/2009 | Skibak | G06T 11/001 345/441 |
| 7,603,342 B2 | 10/2009 | Gosse et al. | |
| 7,633,513 B2 * | 12/2009 | Kondo | G06K 9/4609 345/441 |
| 7,639,258 B1 * | 12/2009 | Dowling | G06T 11/203 345/441 |
| 7,650,616 B2 | 1/2010 | Lee | |
| 7,782,954 B2 | 8/2010 | Liang et al. | |
| 7,920,748 B2 | 4/2011 | Sharon et al. | |
| 8,009,897 B2 | 8/2011 | Xu et al. | |
| 8,018,494 B2 * | 9/2011 | Yokomitsu | G06K 9/00771 348/208.14 |
| 8,059,915 B2 | 11/2011 | Sharon et al. | |
| 8,073,197 B2 * | 12/2011 | Xu | G06K 9/00771 348/169 |
| 8,134,557 B2 * | 3/2012 | Fuchie | G06T 15/40 345/420 |
| 8,139,067 B2 | 3/2012 | Anguelov et al. | |
| 8,145,656 B2 | 3/2012 | Shatz et al. | |
| 8,217,884 B2 * | 7/2012 | Mizuno | G09G 5/006 345/213 |
| 8,233,545 B2 | 7/2012 | Ahuja et al. | |
| 8,351,776 B2 * | 1/2013 | Garg | G02B 7/34 396/123 |
| 8,364,660 B2 | 1/2013 | Delgo et al. | |
| 8,364,698 B2 | 1/2013 | Delgo et al. | |
| 8,379,915 B2 | 2/2013 | Sharon et al. | |
| 8,385,687 B1 | 2/2013 | Blais-Morin | |
| 8,488,839 B2 | 7/2013 | Sharon et al. | |
| 8,526,731 B2 | 9/2013 | Li et al. | |
| 8,594,392 B2 | 11/2013 | Bilobrov | |
| 8,719,884 B2 | 5/2014 | Sharon et al. | |
| 2003/0152277 A1 | 8/2003 | Hall et al. | |
| 2004/0013305 A1 | 1/2004 | Brandt et al. | |
| 2004/0071217 A1 * | 4/2004 | Lin | H04N 19/176 375/240.25 |
| 2004/0081239 A1 | 4/2004 | Patti et al. | |
| 2004/0125877 A1 | 7/2004 | Chang et al. | |
| 2004/0240725 A1 | 12/2004 | Xu et al. | |
| 2005/0050023 A1 | 3/2005 | Gosse et al. | |
| 2005/0069037 A1 | 3/2005 | Jiang | |
| 2005/0195903 A1 * | 9/2005 | Karandikar | H04N 19/134 375/240.27 |
| 2005/0276475 A1 * | 12/2005 | Sawada | H04N 1/648 382/167 |
| 2006/0059120 A1 | 3/2006 | Xiong et al. | |
| 2006/0075237 A1 | 4/2006 | Seo et al. | |
| 2006/0122839 A1 | 6/2006 | Li-Chun et al. | |
| 2006/0195861 A1 | 8/2006 | Lee | |
| 2007/0070226 A1 | 3/2007 | Matusik et al. | |
| 2007/0080965 A1 * | 4/2007 | Kondo | G06K 9/4609 345/441 |
| 2007/0086669 A1 | 4/2007 | Berger | |
| 2007/0106952 A1 | 5/2007 | Matas et al. | |
| 2007/0110333 A1 * | 5/2007 | Kondo | G06K 9/4609 382/276 |
| 2007/0116365 A1 * | 5/2007 | Kloer | G06K 9/6228 382/190 |
| 2007/0216687 A1 * | 9/2007 | Kaasila | G06F 3/0481 345/441 |
| 2008/0101656 A1 * | 5/2008 | Barnes | G06T 7/0042 382/104 |
| 2008/0118107 A1 | 5/2008 | Sharon et al. | |
| 2008/0120290 A1 | 5/2008 | Delgo et al. | |
| 2008/0120291 A1 | 5/2008 | Delgo et al. | |
| 2008/0120328 A1 | 5/2008 | Delgo et al. | |
| 2009/0060277 A1 * | 3/2009 | Zhang | G06K 9/00711 382/103 |
| 2009/0074235 A1 | 3/2009 | Lahr et al. | |
| 2009/0079859 A1 * | 3/2009 | Hagiwara | H04N 9/045 348/311 |
| 2009/0083228 A1 | 3/2009 | Shatz et al. | |
| 2009/0252419 A1 | 10/2009 | Knee | |
| 2009/0263023 A1 | 10/2009 | Iwamoto | |
| 2009/0271398 A1 | 10/2009 | Scherf et al. | |
| 2009/0290020 A1 * | 11/2009 | McLeish | G06K 9/00771 348/143 |
| 2010/0034467 A1 | 2/2010 | Yu et al. | |
| 2010/0061590 A1 | 3/2010 | Neogi | |
| 2010/0095320 A1 | 4/2010 | Lee | |
| 2010/0265354 A1 * | 10/2010 | Kameyama | H04N 19/33 348/222.1 |
| 2011/0043652 A1 | 2/2011 | King et al. | |
| 2011/0085049 A1 | 4/2011 | Dolgin et al. | |
| 2011/0169976 A1 | 7/2011 | Carter et al. | |
| 2011/0246402 A1 | 10/2011 | Burman | |
| 2011/0249867 A1 | 10/2011 | Haas et al. | |
| 2011/0274353 A1 | 11/2011 | Yu et al. | |
| 2012/0008821 A1 | 1/2012 | Sharon et al. | |
| 2012/0207404 A1 | 8/2012 | Robles-Kelly et al. | |
| 2013/0014016 A1 | 1/2013 | Delgo et al. | |
| 2013/0016897 A1 | 1/2013 | Cho et al. | |
| 2013/0083003 A1 | 4/2013 | Perez et al. | |
| 2013/0083192 A1 | 4/2013 | Strine et al. | |
| 2013/0215116 A1 | 8/2013 | Siddique et al. | |
| 2013/0326573 A1 | 12/2013 | Sharon et al. | |
| 2013/0329814 A1 * | 12/2013 | Norkin | H04N 19/00909 375/240.29 |
| 2014/0270540 A1 * | 9/2014 | Spector | G06T 7/0087 382/199 |

FOREIGN PATENT DOCUMENTS

WO WO2010/151215 A1 12/2010
WO WO2012/058442 A1 5/2012

OTHER PUBLICATIONS

Ren, et al., "Shot Boundary Detection in MPEG Videos using Local and Global Indicators", In Proceedings of IEEE Transactions on Circuits and Systems for Video Technology, vol. 19, No. 8, Aug. 2009, 5 pages.
U.S. Appl. No. 13/104,793, filed May 10, 2011.
Office Action for U.S. Appl. No. 13/104,793, filed May 10, 2011, mailed May 9, 2014.
Response to Office Action mailed May 9, 2014 for U.S. Appl. No. 13/104,793, filed May 10, 2011, filed Nov. 12, 2013.
Final Office Action for U.S. Appl. No. 13/104,793, filed May 10, 2011, mailed Feb. 13, 2014.

(56) References Cited

OTHER PUBLICATIONS

Response to Final Office Action for U.S. Appl. No. 13/104,793, filed May 10, 2011, filed Jun. 13, 2014.
Office Action for U.S. Appl. No. 13/104,793, filed May 10, 2011, mailed Jul. 2, 2014.
Non-final Office Action dated Aug. 13, 2015, U.S. Appl. No. 14/260,171, filed Apr. 23, 2014.
Response to Office Action dated Dec. 2, 2014, U.S. Appl. No. 13/104,793, filed May 10, 2011.
Sadlier et al., "Automatic TV Advertisement Detection from MPEG Bitstream," Center for Digital Video Processing, Dublin City University, 2002, 20 pages.
Rosten, et al., "Robust feature matching in 2.3ms," Department of Engineering, University of Cambridge, UK, 2009, 8 pages.
Non-final Office Action dated Aug. 25, 2015, U.S. Appl. No. 13/104,793, filed May 10, 2011.
Amendment dated Jun. 2, 2015, U.S. Appl. No. 13/104,793, filed May 10, 2011.
Notice of Allowance dated Mar. 3, 2015, U.S. Appl. No. 13/104,793, filed May 10, 2011.
Notice of Allowance dated Dec. 9, 2015, U.S. Appl. No. 14/260,171, filed Apr. 23, 2014.
Shum, Heung-Yeung, et al., "Systems and Experiment Paper: Construction of Panoramic Image Mosaics with Global and Local Alignment," International Journal of Computer Vision, Kluwer Academic Publishers, BO, vol. 36, No. 2, Feb. 1, 2000, 48 pages.
International Search Report & The Written Opinion of the International Searching Authority dated Jan. 18, 2016, International Application No. PCT/US2015/025495.
Final Office Action dated Feb. 26, 2016, U.S. Appl. No. 13/104,793, filed May 10, 2011.
Response to Office Action dated Nov. 12, 2015, U.S. Appl. No. 14/260,171, filed Apr. 23, 2014.
Response to Office Action dated Nov. 24, 2015, U.S. Appl. No. 13/104,793, filed May 10, 2011.

\* cited by examiner

Fig. 2A
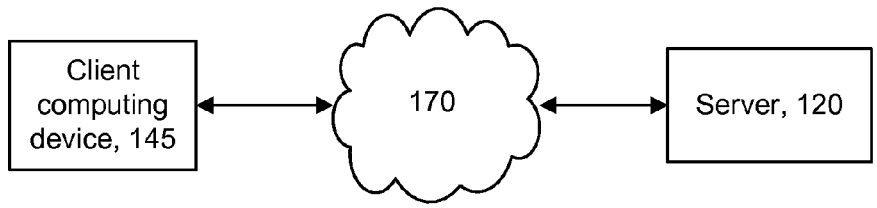
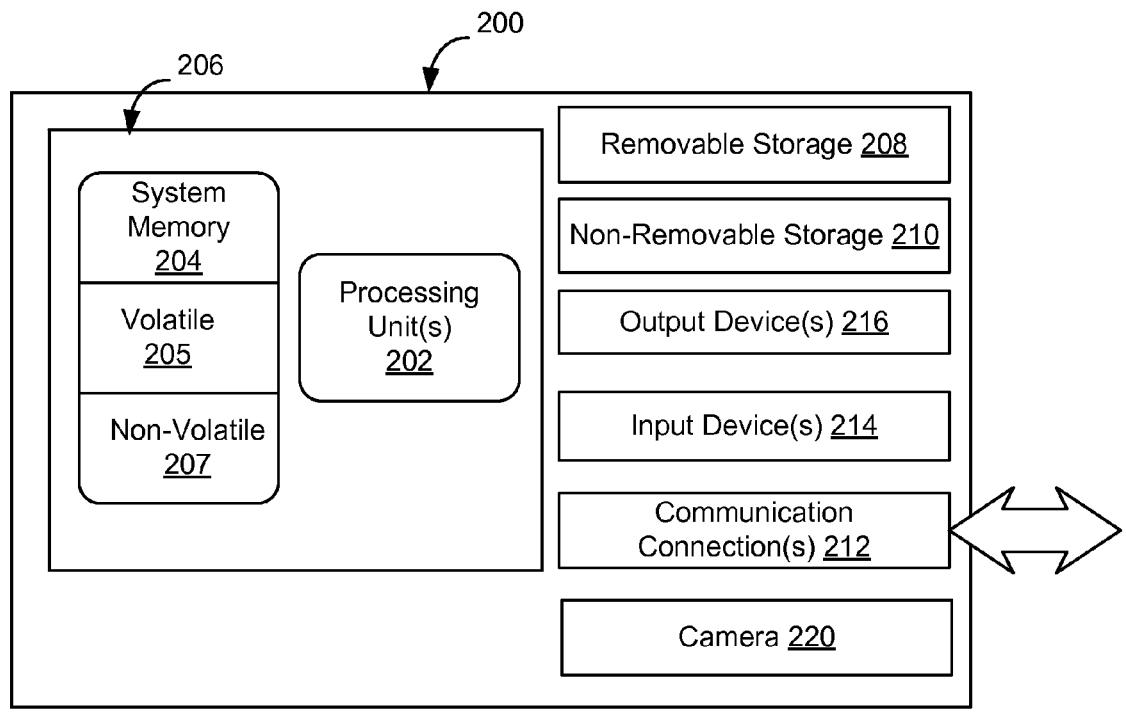
FIG. 2B

SCREEN DETECTOR

PRIORITY CLAIM

This application is a continuation-in-part of U.S. patent application Ser. No. 13/104,793, filed May 10, 2011 and published as U.S. 2012/0008821 on Jan. 12, 2012, which claims the benefit of U.S. Provisional Application No. 61/333,093, filed May 10, 2010, and U.S. Provisional Application No. 61/430,445, filed Jan. 6, 2011. This application is a continuation-in-part of U.S. patent application Ser. No. 14/260,171, filed Apr. 23, 2014 published as US 2015/0310614 on Oct. 29, 2015 and issued as U.S. Pat. No. 9,311,708 on Apr. 12, 2016. All said Applications are incorporated herein by reference.

BACKGROUND

The world is filled with display screens, computer monitors, image projectors, street signs, electronic bulletin boards, etc. All of these are examples of "screens" that display images, video, and other content. The ability to accurately detect the boundaries of such screens and separate them from the background has many application including, but not limited to, Automatic Content Recognition (ACR) of TV and video content, augmented reality experience to merge screen content and virtual objects, reading dynamic street signs, transmitting and syncing messages through large electronic bulletin boards (e.g., score boards in a stadium, departure/arrival screens in airports), and recognizing the identity of an exhibition in museums or other show rooms.

SUMMARY

Technology described herein provides various embodiments for detecting screens in image data. This could be a dynamic screen, such as a display screen of an electronic device, or even in some cases a static screen such as a street sign.

One embodiment is a method that includes the following. A processing image is formed based on frames of image data. The processing image comprises values corresponding to the pixels in the plurality of frames. A set of lines that are candidate for boundaries of a screen are identified in the frames. For each line in the set, comparing the processing image on one side of the line with the other side of the line is performed. A set of screen candidates are formed based on the comparisons. Screens in the screen candidates are scored according to a criterion. A screen candidate in the set of screen candidates is selected based on the scoring.

One embodiment is a system comprising a camera that generates frames of image data and a processor that is configured to perform the following. The processor forms a processing image based on corresponding pixels in the frames of image data. The processing image comprises values corresponding to the pixels in the plurality of frames. The processor identifies a set of lines in the frames of image data that are candidates for boundaries of a screen. For each line in the set, the processor forms a running total of values in the processing image on both sides of the line and compares at least one value in the running total on one side of the line with the corresponding value in the running total on the other side of the line. The processor forms a set of screen candidates based on the comparisons. The processor scores screens in the screen candidates according to a criterion. The processor selects a screen in the set of screen candidates based on the scoring.

One embodiment is computer-readable storage device having computer-readable instructions embodied thereon for use by a processor. The computer-readable instructions cause the processor to access a plurality of frames of image data captured by a camera, and to form an action image based on differences between corresponding pixels in two or more of a plurality of frames of image data. The action image comprises action values corresponding to pixels in the frames of image data. The computer-readable instructions cause the processor to select a set of lines in the plurality of frames that are candidate for boundaries of a screen. The computer-readable instructions cause the processor to integrate the action image on each side of each selected line to form first integration results for a first side of each selected line and second integration results for a second side of each selected line. The processor compares the first and second integration results for each selected line. The computer-readable instructions cause the processor to form a set of screen candidates based on the comparison of the first and second integration results. The computer-readable instructions cause the processor to score screen candidates according to a criterion. The computer-readable instructions cause the processor to select a first of the screens in the set of screen candidates based on the scoring.

BRIEF DESCRIPTION OF THE DRAWINGS

FIG. 2A depicts a computing system comprising a client computing device, a network communication medium and a server.

FIG. 2B depicts an example embodiment of a computing device.

Figure 1:
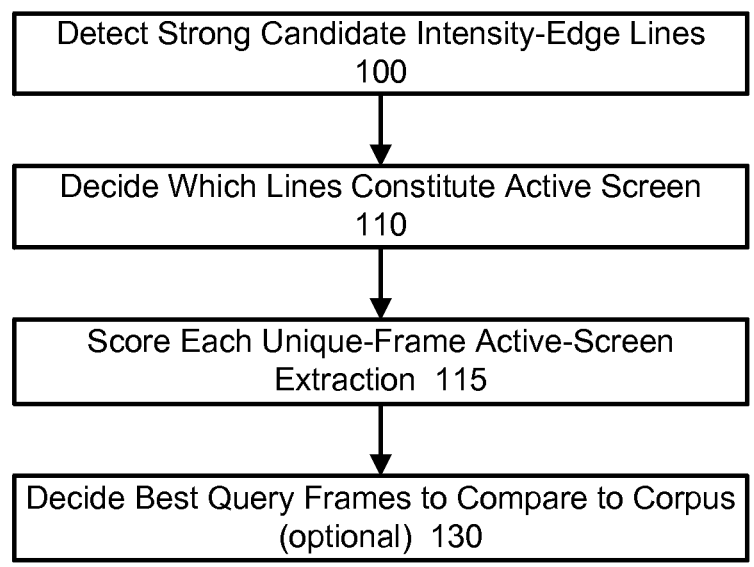
FIG. 1 illustrates an example of a screen detection and extraction process in accordance with one embodiment.

DETAILED DESCRIPTION 2010 was the year that mobile devices appeared to break through. Almost overnight it appeared that everyone had a 3G or better device, touch capable and camera equipped with them at all times. Tactile, intuitive interfaces are quickly taking a big chunk of consumer attention previously limited to websites, and many publishers are going "mobile first" investing most if not all of their attention in mobile apps. Mobile is not just about phones any more. Further, video has become central to mobile carriers' strategy as they deploy 4G networks, with large screen phones, tablets and other connected devices allowing ubiquitous access to more and more of the media out there—either for viewing on the device or for projecting onto any one of the screens at home.

In one embodiment, the system can automatically detect a screen in image frame data. The screen could be playing video. The screen on which the video may be playing can be either stationary or moving itself.

The technology described herein provides techniques for screen detection (which may also be referred to as "screen extraction"). The world is filled with display screens, computer monitors, image projectors, street signs, electronic bulletin boards, etc. All of these are examples of "screens" that display images, video, and other content. The ability to accurately detect the boundaries of such screens and separate them from the background has many application including, but not limited to, Automatic Content Recognition (ACR) of TV and video content, augmented reality experience to merge screen content and virtual objects, reading dynamic street signs, transmitting and syncing messages through large electronic bulletin boards (e.g., score boards in a stadium, departure/arrival screens in airports), and recognizing the identity of an exhibition in museums or other show rooms. In one embodiment, a screen is detected in frames of image data. The frames might have been captured by a video camera on a hand held device, as one example.

In one embodiment, collaborative alignment of the frames may help to counter the motion of the camera in a process that detects screens. One embodiment is collaboratively aligning related frames of image data. Collaborative alignment determines a correspondence between pixels in pairs of the frames of image data, as well as a confidence in that correspondence. A coordinate system (or transformation) is assigned to each of the frames that is consistent with the correspondences between each of the pairs. The confidence in the respective correspondences may be used to provide a weighting to a correspondence when assigning the coordinate systems.

One advantage of a collaborative alignment embodiment is that the coordinate system that is assigned to each frame to align it with the others is calculated using multiple alignment pairwise measurements with other neighboring frames. A large set of these pairwise measurements may be processed to provide a result that maximizes the consistency between measurements.

Also, the collaborative alignment embodiment is able to identify erroneous or outlying frames, which may be removed or corrected. Then, collaborative alignment embodiment may be repeated with the outlying frames removed or corrected.

Visual and Audio Query, Signatures Search and Video ID Results

Embodiments of the invention include a signature search methodology leading to the video identification, which may include the following.

Preparing the query-frames for the visual query, including identifying screen boundaries and selecting representative frames. The clips frames can be processed for extracting the active video screen in each over which the signatures can be computed. Then a confidence score computed for the goodness-of-screen-extraction can be used in conjunction with the statistical nature of the signature (e.g., the signature being a non-degenerate) in order to line up a few signatures from the clip in the order by which they are to be compared to the signature corpus of the ground-truth videos for identifying the correct frames/video.

Screen Detection and Extraction

As depicted in FIG. 1, the system can process visual-query clips or other image frame data to detect the active video-play screen area ("active screen"). Frame signatures can subsequently be computed to allow the indexing and search of the content, in one embodiment. Some measurements used for the extraction of the active screen recorded in the visual query clip or other image frame data are listed and described below, after which a screen extraction workflow is outlined below.

1. Fast detection (block 100) for each video frame of all various straight intensity-transition lines ("intensity-edges") of suitable lengths, locations and orientations which are valid candidates for being the four edges outlining the recorded active screen. Further, since many phones have an orientation detector, the system can require that the line-integral orientations be determined relative to the phone orientation.

2. Calculating the average color (intensity) over both sides of the lines of the candidate intensity-edges (the lines whose averages-intensity difference is the magnitude of the edge in their direction and orientation).

3. Calculating the intensity distribution along both sides of the lines of the candidate intensity-edges (the lines whose averages-intensity difference is the magnitude of the edge in their direction and orientation), and determining the "line-support" of the average intensity along each of those lines—that is, which line parts does the majority of the average intensity is coming from. Thus determining the line support for the entire intensity-edge response as well.

4. Analyzing the intensity distribution along both sides of the lines of the candidate intensity-edges, and determining the variance of the intensities along each of the lines, as well as the "line-support" of this intensity-variance along each of those lines (which line parts does the majority of the intensity-variance coming from). Thus determining the line support for the intensity-variance differences between the two-side lines along each intensity-edge as well.

5. Analyzing each of the candidate intensity-edge lines for determining the extent to which each such line may be crossing through a continuous substantial image object (having an intensity which is significantly greater than zero: meaning that this part of the image is not totally in the dark). Then scoring lower these lines which are crossing substantial object with respect to their probability of being the correct edges (block 110) of the active video screen. One technique for scoring the lines can be judging whether they are crossing some continuous image segments.

The above can be implemented in suitable algorithms for fast multi-scale calculation of line edges and line intensity variances.

6. Sorting out a few potential sets of four edges each representing a different hypothesis for the whereabouts of an active video screen (bounded by its edges). Each screen hypothesis can be scored (block 115) for its "goodness" according to various screen considerations (e.g., the screen hypothesis fitting better to a guiding inner frame presented to the recording person on the mobile-camera side for visual feedback and more stable screen capture; and/or screen hypothesis with more likely aspect ratios).

7. Local aggregation and optimization across small time segments, "sawing-up" together matching consecutive such screen hypothesis (sets of four edges each) for getting a more-global aggregated scoring of the goodness of each of the screen hypothesis participating, and correcting this way potential local (in time) screen-detection scoring errors. To get rid of any remaining screen-detection outliers (errors in detection for some of the frames), the system can employ a global set of equations, to be satisfied simultaneously by all of the screen-detection hypotheses, under which every single screen detection needs be well predicted by the average of the detections of its temporal frame neighbors.

8. Motion analysis between consecutive video frames using, for example, optical-flow methods, mostly applied to the image peripheries (hence avoiding relying on the intensities of the ever changing video content within the recorded active screen), and injecting the detected motion parameters into the local screen-hypothesis optimization and the goodness-of-screen scoring as explained in points 6 and 7 above.

9. Using local frame differences between consecutive video frames (generated by motion within the recorded video) as an important signal for detecting the active video screen according to all the considerations outlined above.

One embodiment is a screen-extraction implemented by the system, which may include the following. The strong candidate intensity-edge lines are detected. Out of all the candidate lines, looking for lines with edges in which the more inwards of the two-side edge lines has a significant (even if small) well-spread intensity variance along the line, and where the more external line has a rather insignificant (even if existing) well-spread spatial intensity variance along the line. For further filtering of candidate lines the system can get rid of lines that cut through any continuous object, as these are suspect to be mid-screen. On top of the line candidates come the active screen structure considerations for deciding which are the four lines that constitute the active screen: for this the system can prefer the more inwards lines amongst all lines that are located around 10% inwards from the inclusive recording full screen of the camera (this is where the guiding frame of the recording application suggests that the user overlays the active video screen on), as well as a more trustable active screen aspect ratio. The system can then use local optimization considerations across time for scoring and fixing each unique-frame active-screen extraction, following which the system can decide which query frames are the ones best being compared (signatures-wise) to the entire video corpus for identifying the clip—the consideration being frames for which the active screen extracted and the signature computed are statistically most trustable.

FIG. 2A depicts a computing system comprising a client computing device 145, a network communication medium 170 and a server 120. The client computing device 145 can be, e.g., a mobile camera, laptop, notepad computer, smart phone, wearable computing device (e.g., head mounted display). The server 120 represents a computing device which provides a service to the client 145. The network communication medium allows the client computing device to communicate with the server. The network 170 may represent one or more networks, which do not necessarily use the same communication protocol. In an embodiment, network 170 may be the Internet, a Wide Area Network (WAN) or a Local Area Network (LAN), singly or in combination. Communication on the network 170 may be wireless or wireline.

The client 145 may have a video camera for capturing images. In one embodiment, the server 120 performs image processing for the client 145, such as aligning frames of image data, detecting computer screens in the image data, etc. In one embodiment, the client 145 performs all or a portion of the image processing locally.

FIG. 2B depicts an example embodiment of a computing device 200. This could be used for the client 145 of FIG. 2A. However, note that embodiments do not necessarily require a server 120 to help with image processing. Rather, the computing device that captures the images could perform the image processing.

In its most basic configuration, computing device 200 typically includes one or more processing units 202 and may include different types of processors as well such as central processing units (CPU) and graphics processing units (GPU). Computing device 200 also includes memory 204. Depending on the exact configuration and type of computing device, memory 204 may include volatile memory 205 (such as RAM), non-volatile memory 207 (such as ROM, flash memory, etc.) or some combination of the two. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210.

Device 200 may also contain communications connection(s) 212 such as one or more network interfaces and transceivers that allow the device to communicate with other devices. Device 200 may also have input device(s) 214 such as keyboard, mouse, pen, voice input device, touch input device, etc. Output device(s) 216 such as a display, speakers, etc. may also be included. All these devices are well known in the art and need not be discussed at length here.

Camera 220 allows the computing device 200 capture frames of image data. In one embodiment, the camera is an RGB camera, which may capture video or still frames. The camera 220 could capture black and white images. The camera may capture 2D image data or 3D image data.

According to an example embodiment, the camera 220 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera. In one embodiment, the camera 220 includes an infra-red (IR) light component, that may be used to capture a depth image of a scene. For example, the camera 220 may emit an infrared light onto the scene and may then use sensors (not shown) to detect the backscattered light from the surface and measure time of flight of one or more targets and objects in the scene.

Figure 3:
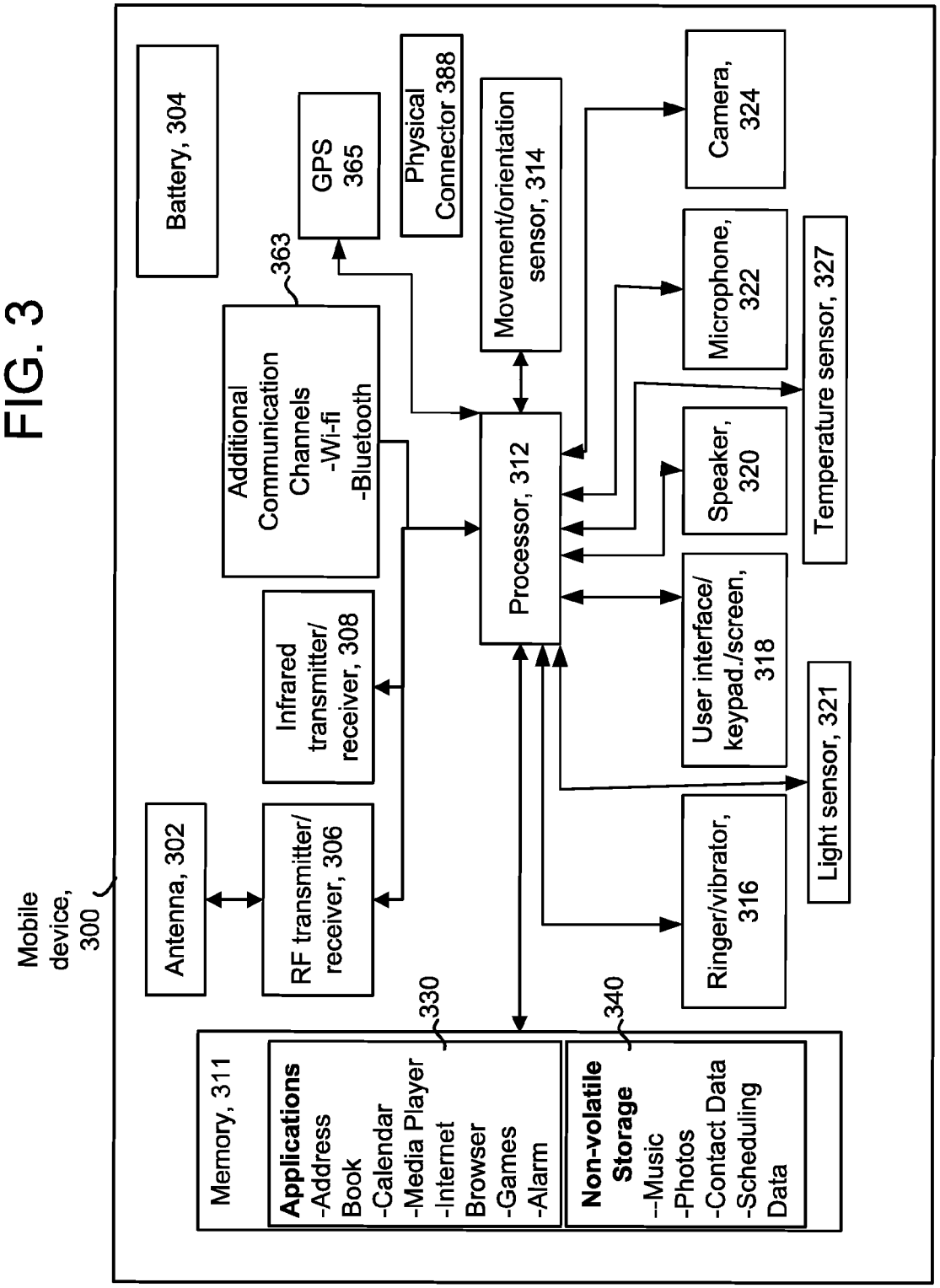
FIG. 3 is a block diagram of an exemplary mobile device which may operate in embodiments of the technology.

FIG. 3 is a block diagram of an exemplary mobile device 300 which may operate in embodiments of the technology. Exemplary electronic circuitry of a typical mobile phone is depicted. The phone 300 includes one or more microprocessors 312, and memory 310 (e.g., non-volatile memory such as ROM and volatile memory such as RAM) which stores processor-readable code which is executed by one or more processors of the control processor 312 to implement the functionality described herein.

Mobile device 300 may include, for example, processors 312, memory 311 including applications and non-volatile storage. The processor 312 can implement communications, as well as any number of applications, including the interaction applications discussed herein. Memory 311 can be any variety of memory storage media types, including non-volatile and volatile memory. A device operating system handles the different operations of the mobile device 300 and may contain user interfaces for operations, such as placing and receiving phone calls, text messaging, checking voicemail, and the like. The applications 330 can be any assortment of programs, such as a camera application for photos and/or videos, an address book, a calendar application, a media player, an internet browser, games, other multimedia applications, an alarm application, etc. The non-volatile storage component 340 in memory 310 contains data such as web caches, music, photos, contact data, scheduling data, and other files.

The processor 312 also communicates with RF transmit/receive circuitry 306 which in turn is coupled to an antenna 302, with an infrared transmitted/receiver 308, with any additional communication channels 360 like Wi-Fi, WUSB, RFID, infrared or Bluetooth, and with a movement/orientation sensor 314 such as a gyroscope or accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. A gyroscope may be used to detect the rotation and orientation of the mobile device. MEMS gyroscopes are also available. The processor 312 further communicates with a ringer/vibrator 316, a user interface keypad/screen, biometric sensor system 318, a speaker 320, a microphone 322, a camera 324, a light sensor 321 and a temperature sensor 327.

The processor 312 controls transmission and reception of wireless signals. During a transmission mode, the processor 312 provides a voice signal from microphone 322, or other data signal, to the RF transmit/receive circuitry 306. The transmit/receive circuitry 306 transmits the signal to a remote station (e.g., a fixed station, operator, other cellular phones, etc.) for communication through the antenna 302. The ringer/vibrator 316 is used to signal an incoming call, text message, calendar reminder, alarm clock reminder, or other notification to the user. During a receiving mode, the transmit/receive circuitry 306 receives a voice or other data signal from a remote station through the antenna 302. A received voice signal is provided to the speaker 320 while other received data signals are also processed appropriately.

Additionally, a physical connector 388 can be used to connect the mobile device 300 to an external power source, such as an AC adapter or powered docking station. The physical connector 388 can also be used as a data connection to a computing device. The data connection allows for operations such as synchronizing mobile device data with the computing data on another device.

A GPS receiver 365 utilizing satellite-based radio navigation to relay the position of the user applications is enabled for such service.

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

The storage device and working memory are examples of tangible, non-transitory computer- or processor-readable storage devices. Storage devices include volatile and non-volatile, removable and non-removable devices implemented in any method or technology for storage of information such as computer readable instructions, data structures, program modules or other data. Computer storage devices include RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can accessed by a computer.

Collaborative Frame Alignment

One embodiment is collaboratively aligning related frames of image data. The technique may calculate the alignment between frames in a sequence of frames depicting a scene or object. One advantage of this technique is that the coordinate system that is assigned to each frame to align it with the others is calculated using multiple pairwise alignment measurements with other neighboring frames. A large set of these pairwise alignment measurements may be processed to provide a result that maximizes the consistency between measurements. Also, the technique is able to identify erroneous or outliers, which may be removed or corrected.

For the purpose of illustration, suppose there are k frames $F_1, F_2, \ldots, F_k$. Each frame contains pixels of image data. For the sake of discussion, each frame has any array of pixels (u, v). A pixel may have a color and an intensity, as one example. In one embodiment, each frame has red, green and blue pixels. Color is not a requirement. In one embodiment, the frames contain depth information. In this 3D example, a pixel may have a depth value. Other possibilities exist for the pixel data.

In one embodiment, each frame is assigned a coordinate system $C_1, C_2, \ldots, C_k$ such that pixels or regions in different frames representing the same point in space are assigned the same coordinate. In other words, we are looking for corresponding pixels or regions in different frames.

A coordinate system $C_i$ is a transformation that maps every pixel (u, v) in $F_i$ to a coordinate value (x, y) or C: (u, v)→(x, y). In one embodiment, the transformations are parameterized with four parameters ($t_x$, $t_y$, $s_x$, $s_y$) that represent translation ($t_x$, $t_y$) and scaling ($s_x$, $s_y$):

$$x(u,v) = s_x u + t_x \quad (1)$$

$$y(u,v) = s_y v + t_y \quad (2)$$

Other parameters such as rotation might also be used. Rotation is measured using a gyroscope, in one embodiment.

Figure 4A:
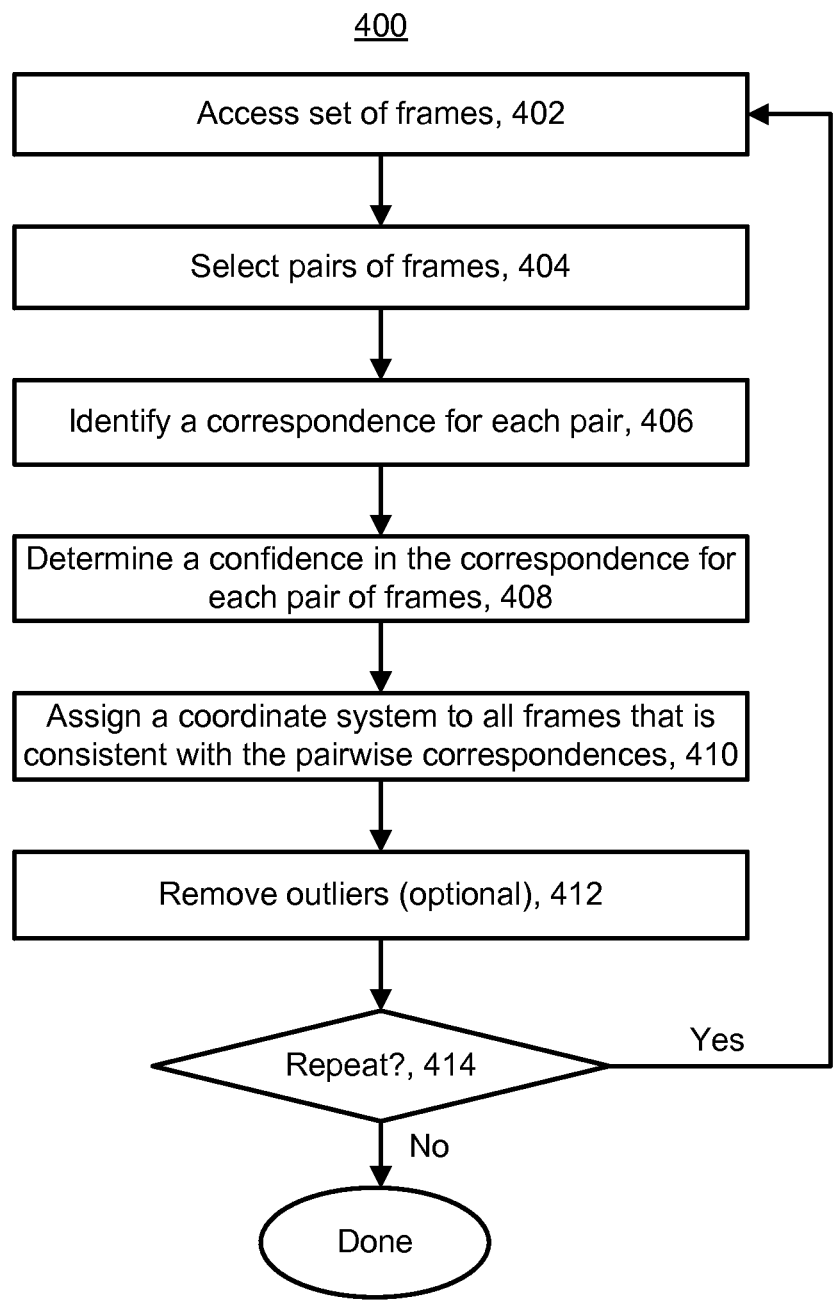
FIG. 4A depicts an overview of a process for collaborative alignment of frames of image data.

FIG. 4A depicts an overview of a process 400 for collaborative alignment of frames of image data. The image data could be 2D or 3D. The image data could be RGB, greyscale, etc. As one example, the image data could be video data captured by a mobile video recording device, such as a handheld video recorder, cellular telephone, notepad computer, etc. In step 402, a set of frames are accessed. In one embodiment there is a time order to the frames, as may be the case for video data.

In step 404 pairs of the frames are selected for analysis. This may be any two frames in the set. For the sake of discussion, these will be referred to as frame $F_i$ and frame $F_j$. These two frames may or may not be consecutive frames. In general, for a set of k frames, there are (k)(k−1)/2 unique pairs to analyze. For the sake of discussion, there may be 10 frames in the set. In this example, there are 45 possible pairs of frames to analyze.

It is not required that all of the possible pairs be analyzed. For purpose of discussion, "m" pairs of frames are selected, where: m≤(k)(k−1)/2. "m" need not be a fixed number; it can be decided adaptively by accumulating confidence from the tested frame pairs. It is evident that each frame may be a member of up to k−1 pairs. In one embodiment, each of the k frames is paired with at least one other frame in the set.

Figure 4B:
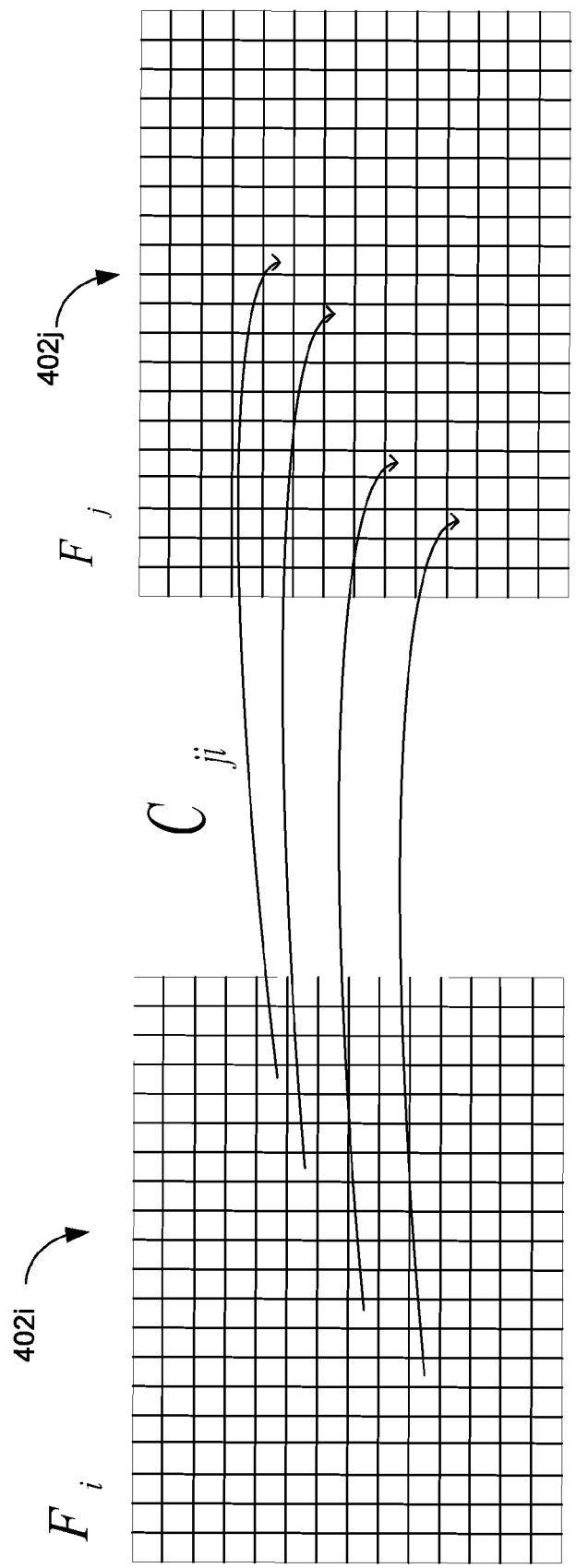
FIG. 4B shows a representation of a correspondence $C_{ji}$ between two frames $F_i$ and $F_j$.

In step 406, a pairwise correspondence is determined for each of the "m" selected pairs of frames $F_i$ and $F_j$. FIG. 4B shows a representation of a correspondence $C_{ji}$ between two frames $F_i$ and $F_j$ (referenced as 402i and 402j). A correspondence may be essentially a mapping of pixels or regions from one frame to their corresponding pixels or regions in the other frame. In this example, each frame has a grid of pixels, which are each represented by one box in the grid. A mapping of four of the pixels from $F_i$ to their corresponding pixels in $F_j$ is represented. Mappings of other pixels is not shown, so as to not obscure the diagram.

In step 408, a confidence in each of correspondences is determined. The confidence is proportional to a transformation error for that correspondence, in one embodiment. Further details are discussed below.

In step 410, a coordinate system is assigned to each of the frames. That is, each frame is assigned its own coordinate system. In one embodiment, the assignment of the coordinate systems is consistent with the correspondences of each of the pairs. This step finds a global alignment between all of the frames. The coordinate system includes transformation parameters, in one embodiment. Examples of transformation parameters include, but are not limited to, scaling, translating, and rotation.

In one embodiment, the confidence that is associated with each of the correspondences is used as a weight to help assign the coordinate system to each frame.

In one embodiment, step 410 includes determining a least squares solution to a set of equations in which the coordinate system for each of the plurality of frames are unknowns and the correspondence for each of the frames of pairs are knowns. Further details are discussed below.

In optional step 412, frames that are outliers are removed. Then, the process may be repeated with the outliers removed.

One reason that a frame could be an outlier is due to noise in that frame. Removing such outliers can improve the overall accuracy of the solution. Details are discussed below. This way the assignment of coordinate systems may be consistent with many different measurements and may be much more robust to single pairwise errors. An outlier might occur do to the camera being sharply bumped. Alternatively, an outlier might be due to noise. Also, full or partial occlusions, for example, some object blocking the view for a limited time, may cause alignment failure.

Figure 5:
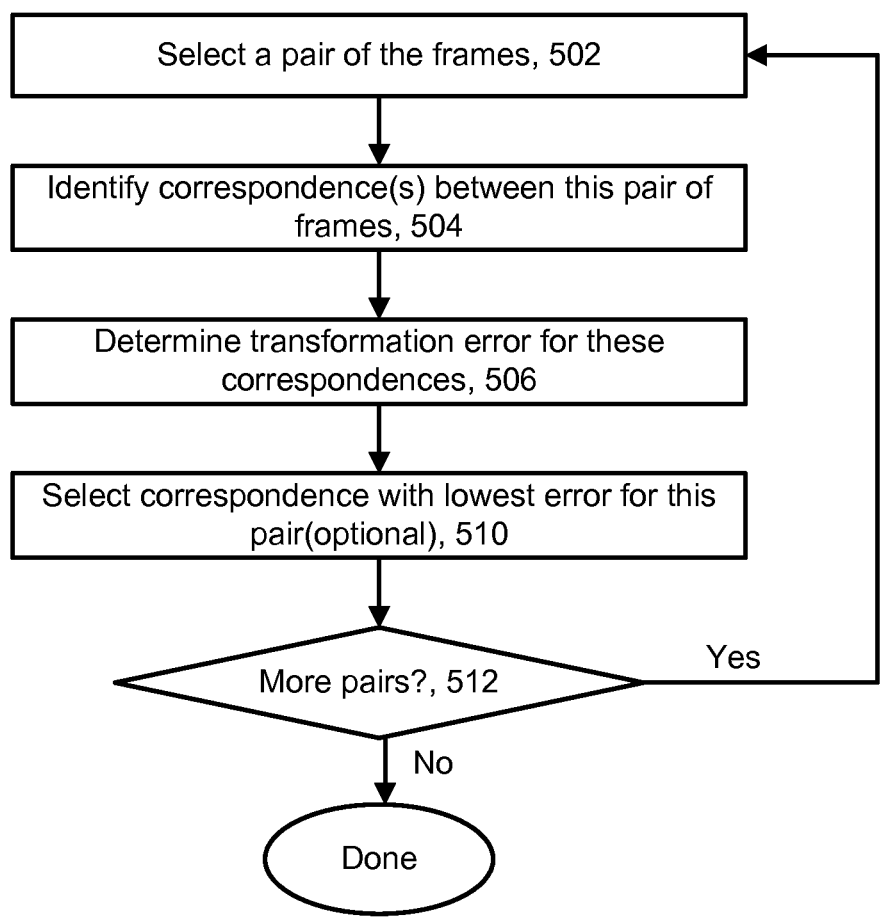
FIG. 5 is a flowchart that shows one embodiment of a process of determining a correspondence for each pair of frames and a confidence in that correspondence.

FIG. 5 is a flowchart that shows one embodiment of a process 500 of determining a correspondence for each pair of frames and a confidence in that correspondence. This is one embodiment of steps 406-408 of FIG. 4A.

In step 502, a pair of the frames is selected for analysis. This may be any two frames in the set. For the sake of discussion, these will be referred to as frame $F_i$ and frame $F_j$. These two frames may or may not be consecutive frames. In general, for a set of k frames, there are (k)(k−1)/2 unique pairs to analyze. For the sake of discussion, there may be 10 frames in the set. In this example, there are 45 possible pairs of frames to analyze. It is not required that all of the possible pairs be analyzed.

In step 504, one or more pairwise correspondence(s) are determined for this pair of frames $F_i$ and $F_j$. In one embodiment, a pairwise correspondence is determined by combining a transformation $C_i$ and $C_j$ for each member of the pair $F_i$ and $F_j$, respectively. Thus, two transformations $C_i$ and $C_j$ can be combined to define a correspondence $C_{ji}$ between pixels (u, v)$_j$ in frame $F_j$ and pixels (u, v)$_i$ in frame $F_i$ as follows:

$$(u,v)_j \approx C_j^{-1} C_i (u,v)_i = (u,v)_i \quad (3)$$

A wide variety of methods can be used to determine a correspondences for the frame pair. Example techniques include, but are not limited to, optical flow and brute force search. For the pair of frames $F_i$, $F_j$ a small subset of correspondences $C_{ji}^c$ may be determined, in step 504. In this example, a set of "c" correspondences are determined for the frame pair.

In step 506, a confidence in each of the correspondences is determined. The confidence is proportional to a transformation error for that correspondence, in one embodiment. In one embodiment, the transformation error is determined by mapping the pixels of one frame to the other frame. Then, the difference between the corresponding pixels are determined. The differences may be aggregated to determine a transformation error. The following equation is one way to calculate the transformation error:

$$e_{ji}^c(F_i, F_j, C_{ji}^c) \triangleq \Sigma_{u,v}(F_i(u,v) - F_j(C_{ji}^c(u,v)))^2 \quad (4)$$

As noted, the confidence may be proportional to a transformation error. Thus, for each of the correspondences $C_{ji}^c$, a corresponding weight $W_{ji}^c$ that represents the confidence in the correspondence may be determined. A possible relationship between the weight and the transformation error is given by the following equation.

$$W_{ji}^c = e^{-\alpha e_{ji}^c} \quad (5)$$

In the above equation, α is a factor that is used to establish the how the confidence is to be made proportional to the transformation error. The value for α is subject to design choice. The pairwise corresponded and the associated confidence may be used in step 410 of FIG. 5.

In one embodiment, the best (e.g., most accurate) correspondence is selected for use in step 410. This is reflected in step 510. However, more than one correspondence may be used in step 410. Thus, step 510 is optional. The process may then repeat for another pair of frames (conditional on step 512).

Assigning Coordinate Systems

The following describes one embodiment of assigning a coordinate system to each frame. This is one embodiment of step 410 of FIG. 4A. As noted above, the coordinate system for a frame may have transformation parameters. For the sake of example, four transformation parameters will be discussed. Specifically, the example transformation parameters are an x-translation ($t_x$), y-translation ($t_y$), x-scaling ($s_x$), and y-scaling ($s_y$). Thus, a goal of one embodiment is to assign a set of these transformation parameters to each frame.

In one embodiment, the pairwise correspondence $C_{ji}$ and their transformation errors are measured or otherwise determined. Note that the pairwise correspondence $C_{ji}$ and their transformation errors do not provide a specific coordinate systems $C_i$ and $C_j$ for the frames in the pair. Instead, it provides the differences between the transformation parameters ($t_x$, $t_y$, $s_x$, $s_y$)$_i$ and ($t_x$, $t_y$, $s_x$, $s_y$)$_j$, as reflected by the following equation:

$$\begin{pmatrix} t_x \\ t_y \\ s_x \\ s_y \end{pmatrix}_i - \begin{pmatrix} t_x \\ t_y \\ s_x \\ s_y \end{pmatrix}_j = \begin{pmatrix} dt_x \\ dt_y \\ ds_x \\ ds_y \end{pmatrix}_{ij} \quad (6)$$

Since there are k frames in the present example, $$\frac{k(k-1)}{2}$$

different differences may be measured. Moreover, each one of these differences has an associated error indicating a confidence in the measurement, according to one embodiment.

The following describes one technique for assigning a coordinate system that is consistent with the correspondences for the frame pairs and their associated confidences.

The vector X is defined in equation 7. This vector represent the unknown transformation parameters for each of the k frames.

$$\vec{X}_{4k \times 1} = \begin{pmatrix} t_{x1} \\ t_{y1} \\ s_{x1} \\ s_{y1} \\ \vdots \\ t_{xk} \\ t_{yk} \\ s_{xk} \\ s_{yk} \end{pmatrix} \quad (7)$$

A vector of m measured differences may be defined as in equation 8. This vector represents the known (e.g., measured) correspondences. For example, these may be the correspondences that are determined in step 406 or 504.

$$\vec{d}_{1 \times 4m} = \begin{pmatrix} \begin{pmatrix} dt_x \\ dt_y \\ ds_x \\ ds_y \end{pmatrix}_1 \\ \vdots \\ \begin{pmatrix} dt_x \\ dt_y \\ ds_x \\ ds_y \end{pmatrix}_m \end{pmatrix} \quad (8)$$

In the above equation, $$m \leq \frac{k(k-1)}{2}.$$

Each of the m correspondences is for one of the m frame pairs. The correspondences may also be referred to as "difference transformation parameters." That is, these refer to transformation parameters ($t_x$, $t_y$, $s_x$, $s_y$) for a frame pair. However, these are transformation parameters that reflect the difference between the transformation parameters for the two frames in the pair.

Next, the set of equations (shown in Equation 9) are solved.

$$A_{4m \times 4k} \vec{X}_{4k \times 1} = \vec{d}_{1 \times 4m} \quad (9)$$

In the above equation, A represent the difference operator. It can be shown that the rank of A is 4 k−4 with the vector X0=(1, 1, 1, . . . , 1) spanning its null space. In other words if X is a solution to the linear set of equations above so will be X+αX0. In order to mitigate this four more rows may be added to the matrix representing a constraint on X0. In one embodiment, a goal is for the average of all translations (tx, ty) to be (0,0) and of all scaling (sx, sy) to be (1,1).

Note also that there may be more equations than parameters (4 m>4 k). Therefore, one solution is a least square solution which finds X that minimizes the least squares error of |AX-d|.

In one embodiment, the weights $W_{ji}^k$ are used to weight the different measurements appropriately giving more emphasis to the difference with higher confidence to resolve conflicting equations that might occur due to measurement inaccuracies.

In summary, one embodiment solves the above equations to assign a coordinate system (e.g., transformation parameters) to each frame. This solution makes use of measurements from frame pairs. In another embodiment, one can use the time or frame sequence information to assemble the pair transformations to further improve the accuracy.

Recall that after making an initial solution, outliers can be removed, and the process can be repeated (see steps 412-414 of FIG. 4A). In one embodiment, outliers are those X that contribute a large quantity to the |Ax−d| norm. Thus, frames that are outliers can be removed from the set of frames to be analyzed, and the process repeated. Another option is to correct the data from the outlier frame.

Screen Detection

One possible use of the collaborative alignment technique is in screen detection.

Figure 6:
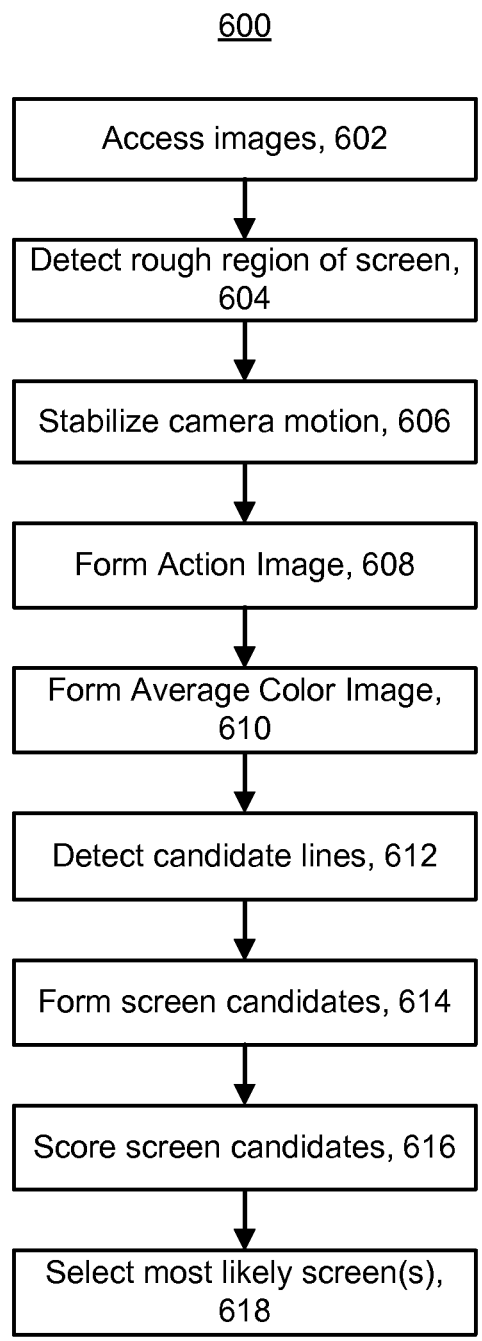
FIG. 6 is a flowchart of one embodiment of a process of screen detection.

FIG. 6 is a flowchart of one embodiment of a process 600 of screen detection. The screen could be a display screen with non-static images. For example, the process could be used to detect the display screen of an electronic device such as a computing device, smart telephone, television, score board, dynamic street sign, etc. The process can also be used to detect a screen that is static. For example, the process could be used to detect a street sign that is static.

Step 602 includes accessing a series of images. For the sake of discussion, the sequence includes K frames of image data. Thus, the input to this process may be a sequence of K frames, which may be expressed as follows:

$$\{I_i\}_{i=1}^{K} \tag{10}$$

In one embodiment, the image data has red, green, and blue channels. This may be represented by:

$$I_i(x,y)=R_i(x,y),G_i(x,y),B_i(x,y) \tag{11}$$

Gray levels may be expressed by the following:

$$Gr_i(x,y)=\alpha R_i(x,y)+\beta G_i(x,y)+\gamma B_i(x,y) \tag{12}$$

Step 604 includes detecting a rough region of the screen. This may include estimating screen location and size. In one embodiment, a low resolution image is analyzed to detect the rough region of the screen. In one embodiment, the system looks for motion. Further details are discussed below. In another embodiment, one can also use the illumination channel, i.e. Y channel, of the YUV images.

Step 606 includes stabilizing camera motion. In one embodiment, collaborative alignment is used to stabilize camera motion. For example, the process of FIG. 4A could be used. However, a technique other than collaborative alignment may be used. In one embodiment, an optical flow technique is used to stabilize camera motion. One possible optical flow technique is a Lucas-Kanade technique. Step 606 could use a technique that compares pixels in one frame with pixels in another frame. Alternatively, step 606 could use a technique that compares features in one frame with features in another frame.

Step 608 includes forming an action image. The action image looks for differences in pixel values between frames. An action image could also be referred to as a difference image. Note that if the screen is not static, it is expected that corresponding pixel values will change over time. However, at the boundary of the screen, the action may change. For example, outside the screen, the image may be static, or may change in a different manner. For example, if the region outside of the screen is non-static such as moving leaves on a tree, there is some action. Further details are discussed below.

The following is an example equation (Equation 13) for an action image. In this example, each color band (red, green, blue) is assigned its own action value. Note that in Equation 13, it is assumed that the image frames have been aligned. Therefore, pixel (x,y) in $R_i$ corresponds to the same object as pixel (x,y) in $R_{i-1}$.

$$A(x, y) = \sqrt[p]{\frac{1}{k} \sum_{i=2}^{k} (R_i(x, y) - R_{i-1}(x, y))^p},$$

$$\sqrt[p]{\frac{1}{k} \sum_{i=2}^{k} (G_i(x, y) - G_{i-1}(x, y))^p},$$

$$\sqrt[p]{\frac{1}{k} \sum_{i=1}^{k} (B_i(x, y) - B_{i-1}(x, y))^p} \tag{13}$$

Forming the action image uses as input "k" frames, in this example. The output is one action image for these k frames. The x,y values in the above equations refer to the coordinates of the frames after the frames have been aligned. Thus, motion due to camera movement, for example, is eliminated as a source of "action", in this embodiment. The parameter "p" may be a constant whose value may be a design choice. Step 618 forms an action image based on differences between corresponding pixels in the different frames, in one embodiment.

Step 610 includes forming an average color image. Each pixel in the average color image represents the average color for that pixel in the set of frames being analyzed. In other words, step 620 forms an average color image based on the average color of corresponding pixels in the different frames, in one embodiment. As with the action image, since this analysis is performed after frame alignment, the pixels being referred to here are post alignment pixels. Thus, (x,y) is used in the equations (as opposed to (μ, v). The following is one example of an equation for calculating an average color image.

$$C(x, y) = \frac{1}{k} \sum_{i=1}^{k} R_i(x, y), \frac{1}{k} \sum_{i=1}^{k} G_i(x, y), \frac{1}{k} \sum_{i=1}^{k} B_i(x, y) \tag{14}$$

Forming the color image may also use as input "k" frames, in this example. The output is one color image for these k frames. In one embodiment, either step 608 and/or 610 form a "processing image" based on corresponding pixels in the frames of image data. The processing image is not necessarily an image that would be viewed by a user. Rather, it may be used for further processing to detect a screen. The processing image comprises values corresponding to the pixels in the frames of image data, in one embodiment.

Step 612 is to detect a set of candidate lines. That is, lines that are candidates as being an edge of a screen are detected. As one example, a set of 16 horizontal lines and 16 vertical lines are found. However, candidate lines are not required to be horizontal or vertical. Also, the definition of what is "horizontal" and what is "vertical" is flexible. A horizontal line may be "roughly" horizontal to account for the possibility the upper and lower edge of the screen are not oriented exactly horizontally in the image data. Similar reasoning applied to the "vertical lines." Note that the overall process may be looking for a rectangular screen. However, a rectangular screen in the real world will not necessarily appear as a rectangle when projected onto the image plane (e.g., the image data). This is one reason why the candidate lines are not required to be perfectly horizontal or perfectly vertical. Also, more or fewer than 32 lines may be found.

These lines may be detected based on the action image and/or the color image. However, the detection could be based on data other than the action image or the color image.

In one embodiment, detecting the candidate lines includes calculating line integrals. In one embodiment, lines that appear to be good candidates as being a screen boundary are selected for further investigation. Lines that are near a discontinuity are selected as candidate lines, in one embodiment. The line integrals may be performed on the action image and/or the color image. Line integrals are not limited to these two examples. Line integrals are discussed below.

Step 614 is forming screen candidates. In one embodiment, the screen is assumed to be roughly rectangular. Thus, two of the "horizontal" and two of the "vertical" lines are selected to form a potential screen, in one embodiment. However, the screen could have any shape. Depending on factors such as the angle and orientation of the screen, it may not appear to be rectangular in the frame images. Such factors are accounted for in various embodiments.

Step 616 includes scoring screen candidates. A number of rules can be used to select a good screen. The following are example rules. An "action test" may be defined based on an assumption that a good screen has significant action inside, but lower action outside of the screen boundary. A "color separation test" may be defined based on an assumption that the average color could change sharply at a screen boundary. An "aspect ratio" test may confirm the screen shape. A "color uniformity of screen boundary test" may be defined based on an assumption that the color should be uniform along a screen boundary. A "strength of corners" test may be defined based on an assumption that the screen is expected to have well defined corners (typically as a result of a rectangular screen). A "color symmetry" test may be defined based on an assumption that the frame of the screen should be the same color on the left as on the right (similar reasoning applied to top and bottom of the frame). Note that not all screens will have frames in which case some of these tests might be ignored or modified. Further details of such tests are discussed below. Step 616 may use any combination of these test, providing various weights to each test. Also, other tests could be used. Thus, it is not required that each of these tests be used, or that they be given the same weight. In one embodiment, only tests that pass contribute to the overall score. Therefore, it is possible for a candidate screen to receive a high score even if a few tests fails.

Step 618 includes selecting a most likely candidate screen or a few top candidate screens based on the scoring.

Figures 7A, 7B, 7C:
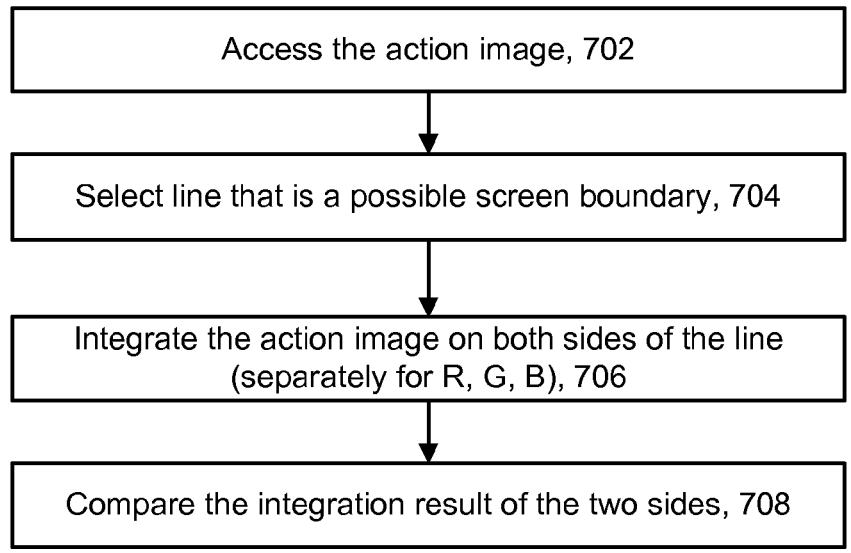
FIG. 7A is a flowchart of one embodiment of performing a line integral test using an action image.
FIG. 7B shows one example of a small portion of an action image for the red component.
FIG. 7C shows the integration of the action image along each side of the selected line.

FIG. 7A is a flowchart of one embodiment of performing a line integral test using an action image. This process could use the action image formed in step 608 of process 600, and may be used in the detecting candidate lines step (FIG. 6, 612). This process describes integrating along one line. The process is typically repeated for a number of lines to be tested.

In step 702, the action image is accessed. In step 704, a line that is a possible screen boundary is selected.

In step 706, the action image is integrated on both sides of the line. This integration may be performed separately for the red, green, and blue values. Integrating the action image means to move along the selected line, while forming a running total of the values in the action image (for each color). More specifically, each running total may be for pixels on one side of the line, as will be discussed in the example below.

FIG. 7B shows one example of a small portion of an action image for the red component. The values are expressed as digits for convenience of illustration. The top row of the action image corresponds to a set of x,y coordinates that are on one side of the line being tested. The bottom row corresponds to the other side of the line. The top and bottom rows may each be referred to as a "band". In this example, each band is one pixel wide. The band could be more than one pixel wide. In other words, each band could include two rows, three rows, etc. In this example, the selected line is a horizontal line. A vertical line may also be selected. The selected line is not required to be perfectly horizontal or perfectly vertical.

FIG. 7C shows the integration of the action image along each side of the selected line. As is depicted, the integration forms a running total of the pixel values-moving from left to right in this example. In this example, the higher values below the selected line indicate that there is more action below the line, which may be indicative of the line being a screen boundary with the screen being below the line. When the band is more than one pixel wide, the integration might still produce one row of integration values, as one example.

Note that the integration can start and stop at any two points along the selected line. Also, once the integration values are calculated it is very simple to re-calculate for a portion of that selected line. For example, to re-determine the final integration value with the first three values ignored, simply subtract 14 from 37 for the top, and subtract 24 from 71 for the bottom. This results in a great savings of processing power if a determination is made that a portion of the line is not of interest.

Step 708 is to compare the integration values on one side of the line with those on the other side of the line. For example, step 708 may generate a value that is the difference between an integration value on one side of the line and a corresponding integration value on the other side of the line. This value can be saved for comparison with integration values for other lines. In one embodiment, step 708 determines whether the difference between an integration value on one side of the line and the corresponding integration value on the other side of the line is greater than some threshold. Also, as noted, the integration for this selected line can be re-calculated for a different portion of the line. This might be performed after integrating along vertical lines. That is, the information from integrating along vertical lines might suggest that a portion of the horizontal line is of greater interest or less interest, wherein the start and end point of the integration on the horizontal line may be altered.

Figure 7D:
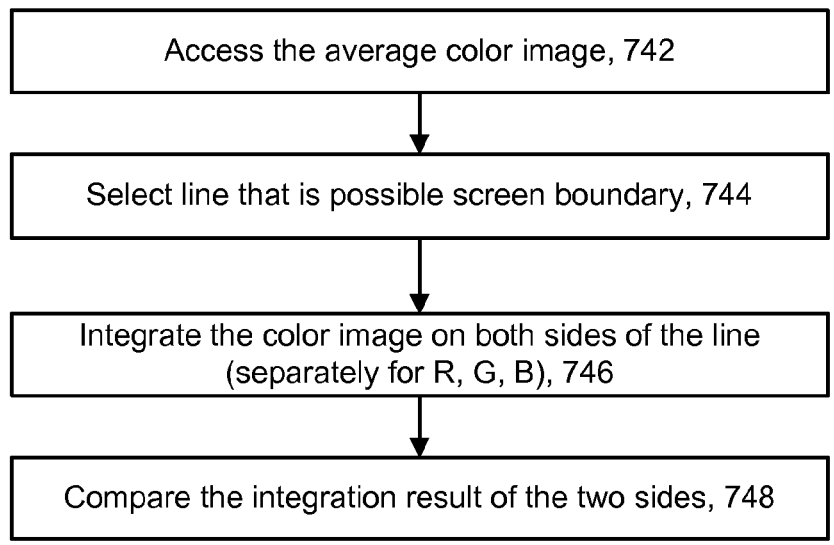
FIG. 7D is a flowchart of one embodiment of performing a line integral test using an average color image.

FIG. 7D is a flowchart of one embodiment of performing a line integral test using an average color image. This process could use the average color image formed in step 610 of process 600, and may be used in the detecting candidate lines step (FIG. 6, 612). This process describes integrating along one line. The process is typically repeated for a number of lines to be tested.

In step 742, the average color image is accessed. In step 744, a line that is a possible screen boundary is selected. One option is to use the same set of lines that were used in the integration of the action image in the process of FIG. 7A.

In step 746, the average color image is integrated on both sides of the line. This integration may be performed separately for the red, green, and blue average values. Integrating the average color image is similar to the integrating the action image. For example, integrating the average color image means to move along the direction of the selected line and to form a running total of the values in the average color image (for each color). Step 748 is to compare the integration values on each side of the line.

After performing the line integrals for the action image and the color image, the results are integration values for many lines being tested. In one embodiment, 16 horizontal lines and 16 vertical lines are selected based on the integration values.

Estimating Screen Location and Size

The following are additional details for one embodiment of estimating screen location and size. This provides further details for one embodiment of step 604 of process 600. In one embodiment, this is performed without (e.g., prior to) aligning the frames of data with each other. This process is applied to some set of frames of image data. In this below discussion, it is assumed that "n" frames are processed. This might be a consecutive set of frames from a video camera, for example.

One motivation for detecting the rough region of the screen (e.g., step 604) is to increase the accuracy of frame alignment (e.g., step 606). Detecting the rough region allows discounting non-camera motions that happen on the screen and might confuse the correspondence estimates. This may be important when the screen size is relatively large in comparison to the surrounding background that provides stable landmarks for alignment.

Figure 8:
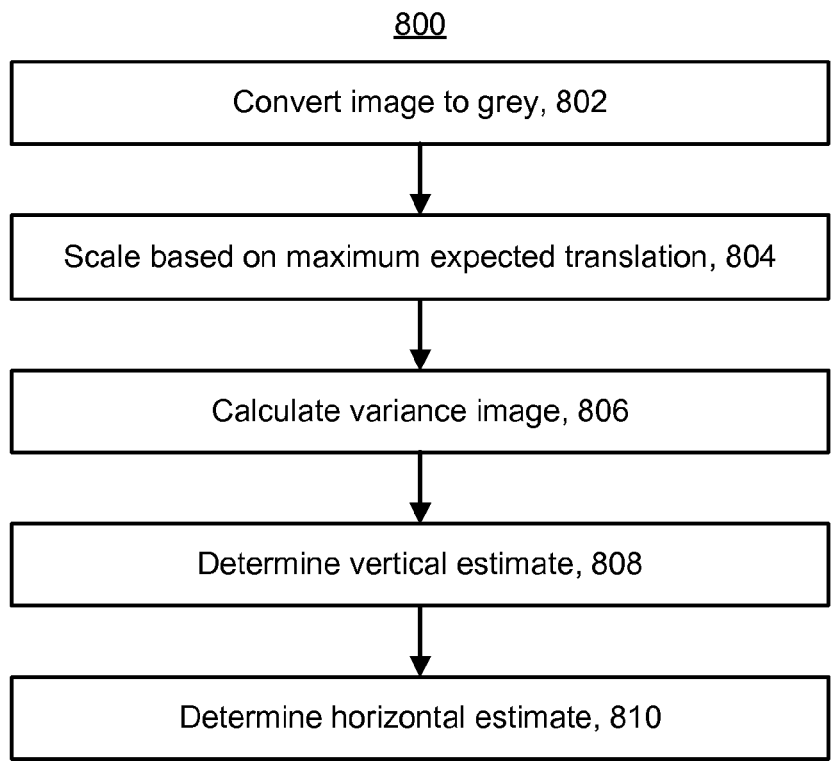
FIG. 8 is a flowchart of one embodiment of a process of estimating screen location and size.

FIG. 8 is a flowchart of one embodiment of a process of estimating screen location and size. Initially, all images may be converted to grey and resized by a scale factor proportional to a maximum estimated translation between frames. Step 802 is to convert the images to grey. The grey levels may be expressed by the following:

$$Gr_i(x,y) = \alpha R_i(x,y) + \beta G_i(x,y) + \gamma B_i(x,y) \quad (15)$$

The foregoing assumes that the input image data is RGB data. However, it is not required that the input be RGB data. Thus, variations of this process are possible in which step 802 is not performed, or is replaced by another step.

Step 804 is to scale the images based on a maximum estimated translation between frames. The maximum estimated x-translation may be expressed as $\Delta x$. The maximum estimated y-translation may be expressed as $\Delta y$. The scaling could be a factor of:

$$\frac{1}{2\Delta x}, \frac{1}{2\Delta y} \quad (16)$$

Next, a variance image V(x,y) may be calculated in step 806. The following equations are one technique for calculating the variance image.

$$E(x, y) = \frac{1}{n} \sum_{1}^{n} Gr_i(x, y) \quad (17)$$

$$E2(x, y) = \frac{1}{n} \sum_{1}^{n} Gr_i^2(x, y) \quad (18)$$

$$V(x, y) = E2(x, y) - (E(x, y))^2 \quad (19)$$

The "n" in the above equations refers to the "n" frames of image data being processed.

Figure 10A:
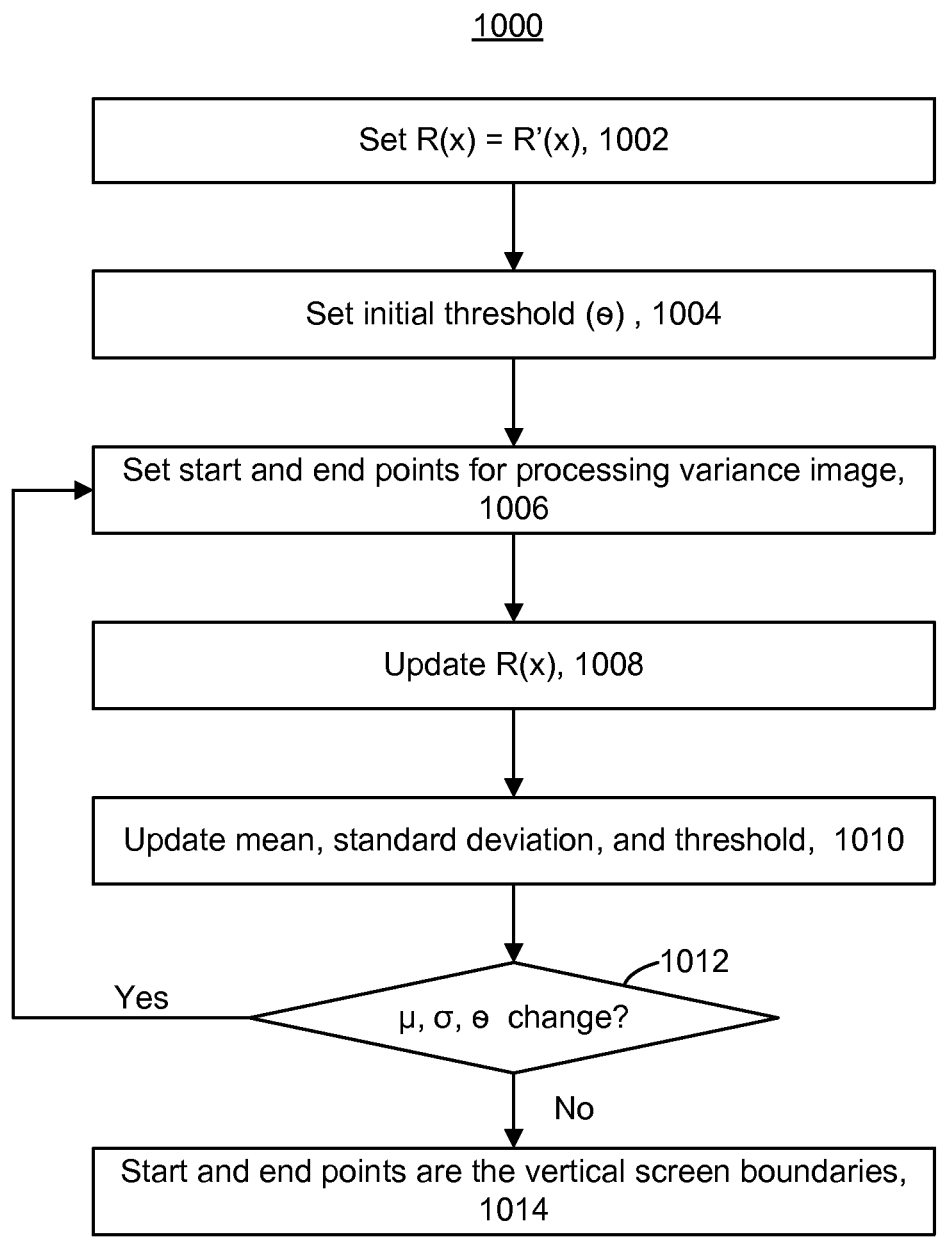
FIG. 10A describes a process for one embodiment of estimating vertical lines of the screen.

In step 808, estimates for vertical lines that might represent a screen are determined based on the variance image. FIG. 10A describes a process for estimating vertical lines of the screen. In step 810, estimates for horizontal lines that might represent a screen are determined FIG. 10B describes a process for estimating horizontal lines.

Figure 9:
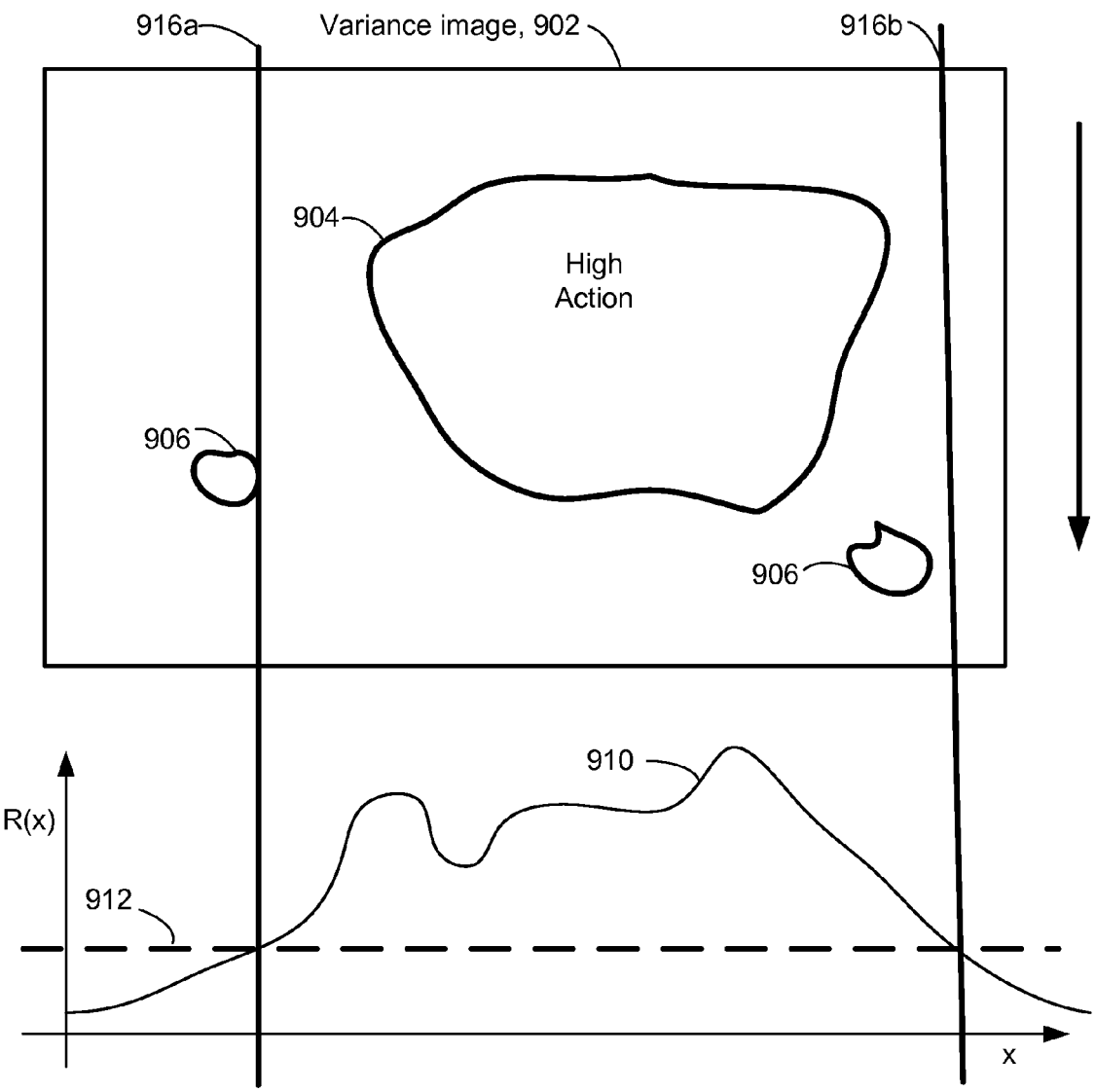
FIG. 9 illustrates principles of estimating vertical edges of a screen, in accordance with one embodiment.

FIG. 9 illustrates principles of estimating vertical lines, in accordance with one embodiment. This may be used in one embodiment of detecting a rough region of the screen (e.g., step 604, FIG. 6). A variance image V(x,y) 902 is shown. Region 904 represents where there is high action in the variance image. The high action region 904 may indicate where a screen is located. Not every high action region is necessarily a screen. Two such high action regions 906, which are not screens are also shown.

The graph below the variance image in FIG. 9 shows a curve 910 for a function R(x), which is used to estimate where vertical lines should be placed. The function R(x) gets recalculated during the process, as will be described below. The initial value for R(x) may be established by a function R'(x), which may be calculated as follows.

$$R'(x) = \sum_{y=0}^{H} V(x,y) \quad (20)$$

In Equation 20, H is the number of rows of pixels in the variance image and W is the number of columns in the variance image. As already noted, the function R(x) that is depicted in FIG. 9 gets recalculated until convergence is reached. Thus, it will be appreciated that the curve 910 in FIG. 9 is not a final value. Note, however, that the curve 910 has higher values where the action is greater.

The following two equations are for the mean ($\mu$) and standard deviation ($\sigma$) of R'(x).

$$\mu = \frac{1}{W} \sum_{x=0}^{W} R(x) \quad (21)$$

$$\sigma^2 = \frac{1}{W} \sum_{x=0}^{W} (R(x) - \mu)^2 \quad (22)$$

FIG. 10A describes a process 1000 for estimating vertical lines of the screen. This may be used in one embodiment of detecting a rough region of the screen (e.g., step 604, FIG. 6). In general, the process starts with an assumption that the screen could be anywhere in the variance image 902. Processing of the variance image 902 involves assuming locations for two vertical lines in the variance image. Initially, these two lines may be at the leftmost and rightmost extremes. Processing may move these two lines inward until the solution converges. Upon convergence, the left and right vertical edges of the screen have been roughly found as the final locations of the lines. Lines 916a and 916b in FIG. 9 represent a left and right vertical line for some hypothetical point in the process prior to convergence.

In one embodiment, the process examines the portion of the variance image that is between these two lines 916a, 916b and the portion of the variance image that is outside of each line 916a, 916b. The curve 910 represents this processing.

In step 1002, R(x) is set to R'(x). Equation 20 provides one suitable equation. Note that by summing from y=0 to y=h, pixels are being summed from top to bottom of the variance image for some x coordinate. This is under an assumption that the upper left is (0,0). The vertical arrow in FIG. 9 next to the variance image 902 is meant to represent the summing for one column of pixels (e.g., one x value).

In step 1004, an initial threshold is established. In one embodiment, this is set as follows:

$$\theta = \mu - 0.5\sigma \quad (23)$$

This establishes the initial threshold ($\theta$) based on the mean and standard deviation of R(x). Note that a factor other than "0.5" could be used. This threshold will be updated in step 1010. Returning again to FIG. 9, line 912 depicts the threshold $\theta$.

In step 1006, start and end parameters are initialized. "Start" conceptually refers to line 916a, and "end" conceptually refers to line 916b, in one embodiment. These parameters will be moved during the process to find the vertical edges of the screen. In one embodiment, the following are used:

$$\text{Start} = \text{Min} x R(x) > \theta \quad (24)$$

$$\text{End} = \text{Max} x R(x) > \theta \quad (25)$$

Start is set to the minimum x value of R(x) for which R(x) is greater than the threshold $\theta$. This is the left line 916a in FIG. 9. End is set to the maximum x value of R(x) for which R(x) is greater than a threshold $\theta$. This is the right line 916b. Note that step 1006 may account for the possibility of noise by looking for two (or more) consecutive x values of R(x) that are greater than the threshold. Also note that when calculating the end point, processing of R(x) may be from the highest to lowest x values.

In step 1008, R(x) is updated. The following equation describes one embodiment for the update.

$$R(x) = \begin{pmatrix} R'(x) & \text{start} < x < \text{end} \\ -2R'(x) & \text{otherwise} \end{pmatrix} \quad (26)$$

Equation 26 represents processing the variance image based on the two lines 916a, 916b. The notation "start<x<end" indicates how the variance image is divided for processing. Conceptually, "start" represents line 916a, and "end" represents line 916b. Portions of the variance image that are between the two lines 916a, 916b may be given a normal weight. This is represented by R'(x) in Equation 26. Another option is to enhance these values.

Portions of the variance image that are outside of the two lines 916a, 916b may be penalized by multiplying them by −2, in one embodiment. This is represented by the "−2R'(x)" (and the "otherwise"). Note that a factor other than "−2" could be used.

In step 1010, the mean and standard deviation of R(x) are updated. In one embodiment, equations 21 and 22 are used for these updates. Also, the threshold is updated. Equation 23 may be used for this update.

In step 1012, a determination is made whether any of the mean, standard deviation, or threshold changed as a result of the update of step 1010. If there is a change to any, then the process returns to step 1006. In step 1006, the start and end values are changed. This is what moves the vertical lines 916a, 916b. Typically, these move inward.

Eventually, the solution should converge, as determined by step 1012. Upon convergence, step 1014 is performed. In step 1014, the final start and end values (from step 1006) are used as the left and right screen boundaries. This processing places the vertical lines 916a, 916b at the edges of the action, in one embodiment.

Figure 10B:
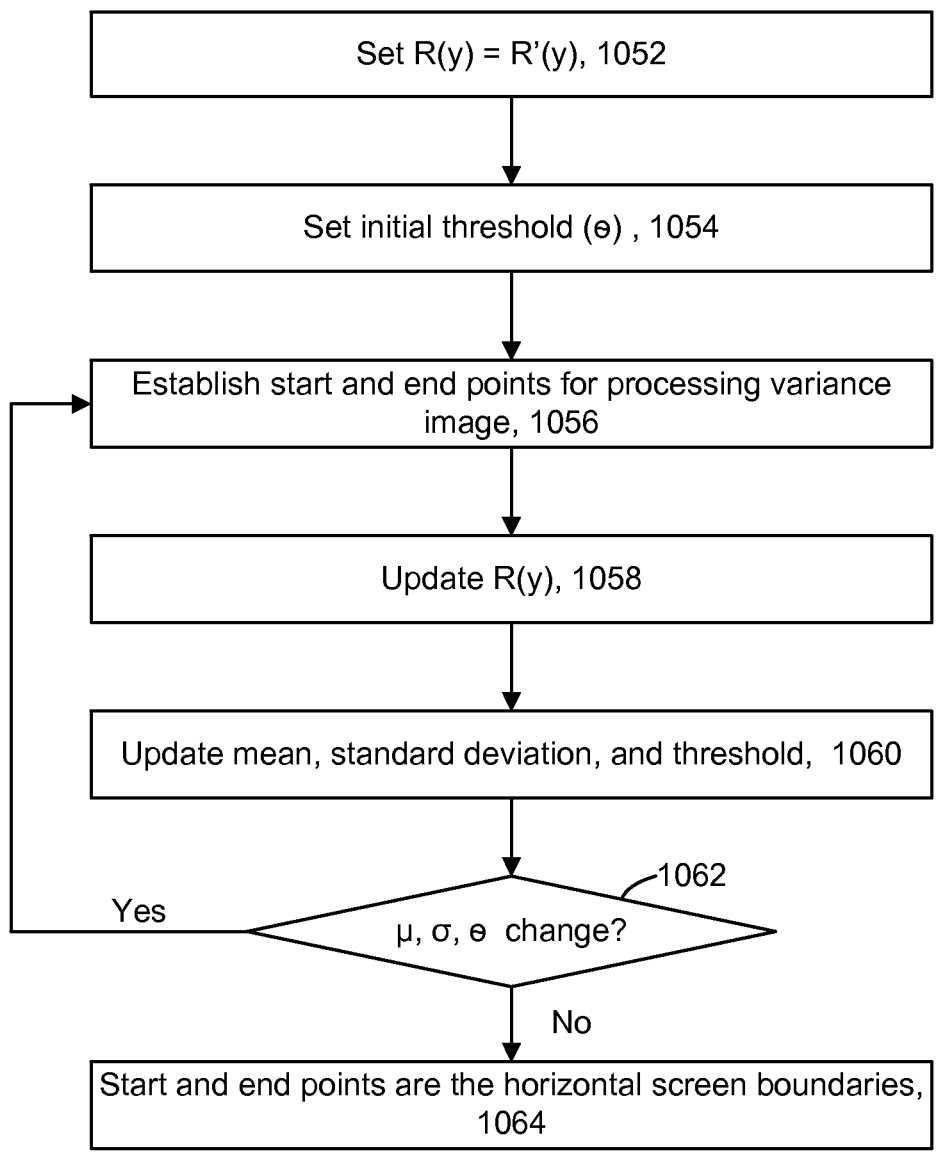
FIG. 10B describes a process for one embodiment of estimating horizontal lines of the screen.

The estimation of the horizontal edges of the screens may be performed in a similar manner. FIG. 10B is one embodiment of a flowchart for determining the horizontal edges. This may be used in one embodiment of detecting a rough region of the screen (e.g., step 604, FIG. 6). This process may be similar to estimating vertical lines and will not be discussed in detail. Processing of the variance image 902 involves assuming locations for two horizontal lines in the variance image, in this embodiment. Initially, these two lines may be at the lowest and highest extremes. Processing may move these two lines inward until the solution converges. Upon convergence, the top and bottom horizontal edges of the screen have been roughly found as the final locations of the lines.

The below equation may be used in the process.

$$R'(y) = \sum_{x=0}^{W} V(x,y) \quad (27)$$

In Equation 27, W is the number of columns of pixels in the variance image.

The following two equations are for the mean (μ) and standard deviation (σ) of R'(y).

$$\mu = \frac{1}{H} \sum_{y=0}^{H} R(y) \quad (28)$$

$$\sigma^2 = \frac{1}{H} \sum_{y=0}^{H} (R(y) - \mu)^2 \quad (29)$$

In step 1052, R(y) is set to R'(y).

In step 1054, an initial threshold is established. In one embodiment, this is set as follows:

$$\theta = \mu - 0.5\sigma \quad (30)$$

This establishes the initial threshold (θ) based on the mean and standard deviation of R(y). Note that a factor other than "0.5" could be used.

In step 1056, start and end parameters are initialized. These may be analogous to the lines 916a, 916b in FIG. 9, but are horizontal lines. These parameters will be moved during the process to find the horizontal edges of the screen. In one embodiment, the following are used:

$$\text{Start} = \text{Min} x R(y) > \theta \quad (31)$$

$$\text{End} = \text{Max} x R(y) > \theta \quad (32)$$

Start is set to the minimum y value of R(y) for which R(y) is greater than the threshold θ. End is set to the maximum y value of R(y) for which R(y) is greater than a threshold θ.

In step 1058, R(y) is updated. The following equation describes one embodiment for the update.

$$R(y) = \begin{pmatrix} R'(y) & \text{start} < y < \text{end} \\ -2R'(y) & \text{otherwise} \end{pmatrix} \quad (33)$$

Equation 33 represents processing the variance image. The notation "start<y<end" indicates how the variance image is divided for processing. Start and end were calculated in step 1056. Portions of the variance image between start and end may be given a normal weight. This is represented by R'(y) in Equation 33. Another option is to enhance these values.

Portions of the variance image that are outside start and end may be penalized by multiplying them by −2, in one embodiment. This is represented by the "−2R'(y)". Note that a factor other than "−2" could be used.

In step 1060, the mean and standard deviation of R(y) are updated. In one embodiment, equations 28 and 29 are used for these updates. Also, the threshold is updated. Equation 30 may be used for this update.

In step 1062, a determination is made whether any of the mean, standard deviation, or threshold changed as a result of the update of step 1060. If there is a change to any, then the process returns to step 1056. In step 1056, the start and end values are changed.

Eventually, the solution should converge, as determined by step 1062. Upon convergence, step 1064 is performed. In step 1064, the final start and end values (from step 1066) are used as the top and bottom screen boundaries.

Scoring Screen Candidates

The following describes further details of scoring screen candidates. This provides further details for one embodiment of step 616 of process 600. A screen candidate (or a top few screen candidates) may be formed from two candidate vertical lines and two candidate horizontal lines. These lines may have been found in step 612 of process 600.

Action Separation Test

One embodiment is an action separation test. The action separation test compares action outside of the screen to the action inside of the screen. The action inside should be greater than outside, in one embodiment of the action separation test. This is thanks to stabilization, which cancels most of the background motion but leaves motion and discontinuities inside the screen, in one embodiment. The action separation test may be performed on four lines, which may be defined by a top, bottom, left, and right screen boundary candidate lines.

Figure 11A:
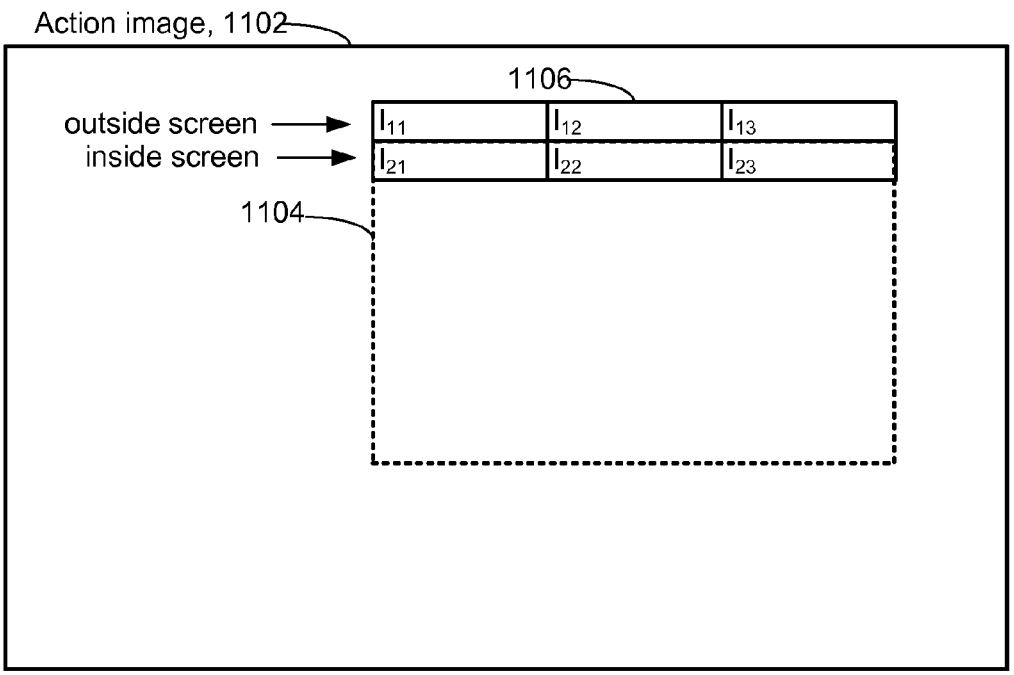
FIG. 11A represents various segments in an action image that are used in one embodiment of an action separation test.

FIG. 11A represents various segments $I_{11}, I_{12}, I_{13}, I_{21}, I_{22}, I_{23}$ (segment $I_{12}$, is references as 1106) in an action image 1102 that are used in one embodiment of an action separation test. The action image 1102 may be formed as described in Equation 15, as one example. Segments, $I_{21}, I_{22}, I_{23}$ are just inside the candidate screen 1104. Segments, $I_{11}, I_{12}, I_{13}$ are just outside the candidate screen 1104.

FIG. 11A represents a top line segment. The candidate screen 1104 is shown by the dotted lines. The candidate screen 1104 may be found as described above in step 614 of process 600. This may involve using the action image and/or average color image as described with respect to FIGS. 7A and 7D, respectively. Although processing of a top line segment is described, analogous processing may be performed for a bottom, left, and right line segment.

There are three segments 1106 on each side of the top line. Thus, three segments are considered to be outside of the screen and three inside. A reason for using three segments is that the action might vary along the line (that defined the top of the screen in this example). For example, there might be substantial action in the middle of the screen, but little action on the right for some reason. Using segments may help to avoid undervaluing the action in the middle in such a case. Any number of segments may be used.

Each segment 1106 thus contains a band of pixels in the action image. The band has a height (in this example) of one or more pixels. For example, the band could be one, two, three, four pixels high. When analyzing a vertical line, the band may have a width that is one or more pixels wide.

Figure 11B:
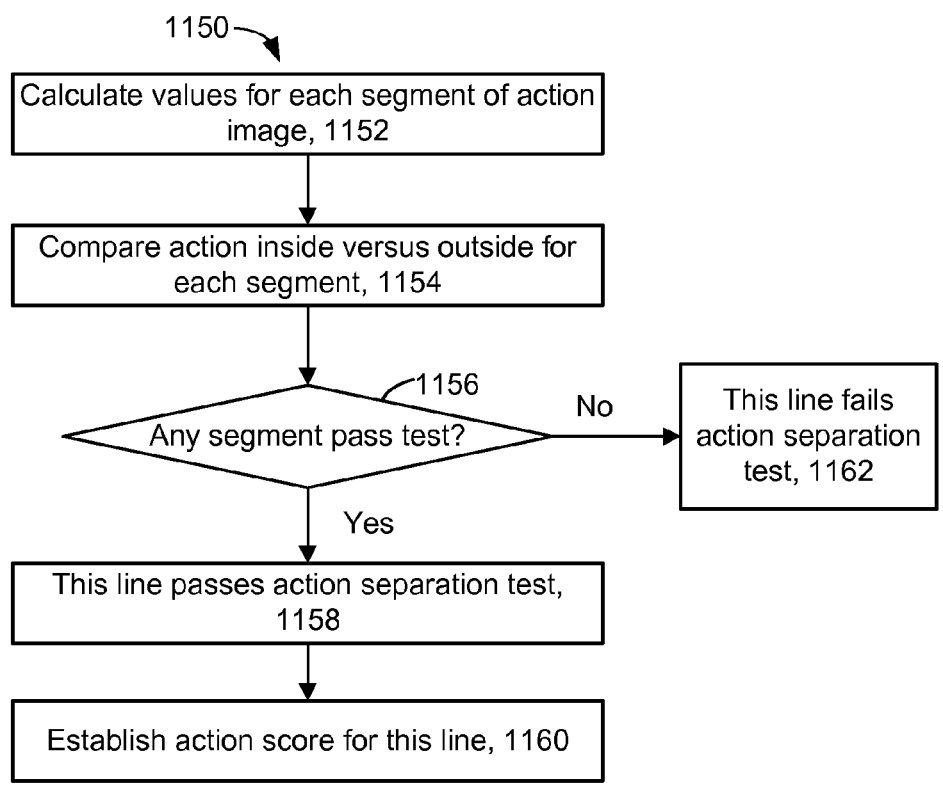
FIG. 11B is a flowchart of one embodiment of an action separation test for one candidate line.

FIG. 11B is a flowchart of one embodiment of an action separation test for one candidate line (e.g., top, bottom, left, right). In step 1152, values for each segment 1106 of the action image are determined. This includes at least one segment inside the screen and at least one segment outside of the screen. This calculation can be made in a number of ways. In one embodiment, there is a red, green, and blue color band for the action image. In such a case, there can be three values determined for each segment. As another possibility, one value could be determined for the combination of these three color bands. In one embodiment, the action image is converted to a grey level image, similar to how the variance image was converted to a grey level image.

In step 1154, action values inside the candidate line are compared with action values outside of the candidate line. The goal to determine whether there is significantly more action inside the screen than outside, in one embodiment.

Step 1154 proceeds on a segment by segment basis, in one embodiment. For example, segment $I_{11}$ is compared with $I_{12}$, etc. In one embodiment, there is also a test that combines all of the segments. For example, an action value may be determined for the combination of $I_{11}, I_{12}, I_{13}$ (e.g., by adding action values for each segment). This may be compared with an action value for the combination of $I_{21}, I_{22}, I_{23}$.

The following are possible tests that could be performed in step 1154.

$$\text{Action inside} > T1 \quad (34)$$

$$\frac{\text{Action Inside}}{\text{Action Outside}} > T2 \text{ AND Action Outide} > T3 \quad (35)$$

In one embodiment, either the test of Equation 34 OR the test of Equation 35 should pass for a segment to pass. Equation 34 tests whether the action for the segment inside the candidate screen is greater than some threshold T1. Equation 34 tests whether the ratio of the action inside to the action outside is greater than some threshold T2 AND whether the action outside is greater than some threshold T3. This may help address cases where the high ratio is by chance, which can happen when both action estimates are getting close to zero.

In the example of FIG. 11A, there are three segments. There may also be a "combination" segments as noted above. Thus, Equations 34 and 35 could be applied to four segments in this example. In one embodiment, if any of these segments pass, then the line passes the action separation test. However, variations are possible, such as requirement two, three, or more of the segments to pass. Also, as noted above, while FIG. 11A shows three segments, any number of segments may be used.

In step 1156, a determination is made whether any of the segment comparisons passed the test(s) of step 1154.

Step 1158 is to note that this candidate line passed. Step 1160 is to establish a score for this line. A variety of techniques can be used. In one embodiment, the score is based on the difference in action values inside the screen and outside the screen. The score could be determined based on subtracted action values outside from those inside. The process 1150 may be repeated for other lines. In one embodiment, all four lines need to pass for the candidate screen to pass the action separation test.

In one embodiment, a total action score for the screen is determined based on the action score for each line. One possibility is to add the action scores for the four candidate lines. Another possibility is to divide the total action inside by the total action outside. Still another possibility is to combine these two methods. Many other techniques are possible for forming a scored based on a comparison of the values of the action image inside the screen candidate with the values of the action image outside the screen candidate.

Step 1162 is to note that this candidate line failed in the event no segment passed. Note that failure could be defined in another manner, such as not enough of the segments passing.

Color Separation Test

One embodiment is a color separation test. The color separation test compares average color outside of the screen to the average color inside of the screen. The average color inside should be different than the outside, in one embodiment of the color separation test. Similar to the action separation test, the color separation test may be performed on four lines, which may be defined by a top, bottom, left, and right screen boundary candidate lines. These can be the same four candidate lines that were analyzed in the action separation test.

Figure 12A:
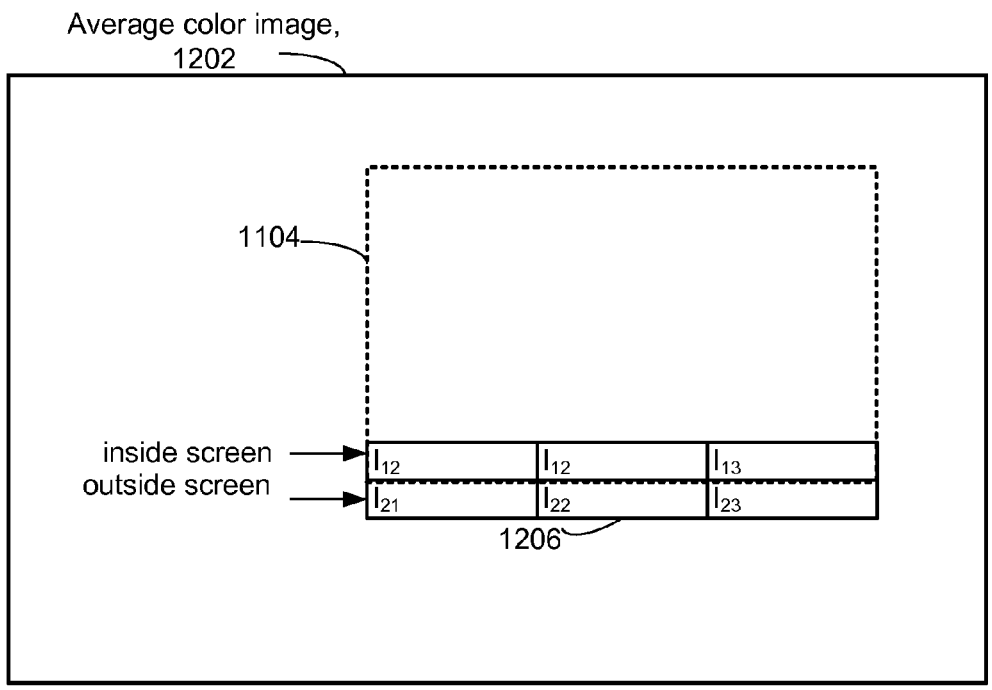
FIG. 12A represents various segments in an average color image that are used in one embodiment of a color separation test.

FIG. 12A represents various segments $I_{11}, I_{12}, I_{13}, I_{21}, I_{22}, I_{23}$ (segment $I_{12}$, is references as 1206) in an average color image 1202 that are used in one embodiment of an color separation test. The average color image 1202 may be formed as described in Equation 16, as one example. Segments, $I_{21}, I_{22}, I_{23}$ are just outside the candidate screen 1104. Segments, $I_{11}, I_{12}, I_{13}$ are just inside the candidate screen 1104.

FIG. 12A represents a top line segment. The candidate screen 1104 is shown by the dotted lines. This may be the same candidate screen as the action separation test. Analogous processing may be performed for a bottom, left, and right line segment.

There are three segments 1206 on each side of the bottom candidate line. A reason for using three segments is that the average color might vary along the candidate line. Any number of segments may be used.

Each segment 1206 thus contains a band of pixels in the average color image 1202. The band has a height (in this example) of one or more pixels. For example, the band could be one, two, three, four pixels high. When analyzing a vertical line, the band may have a width that is one or more pixels wide.

Figure 12B:
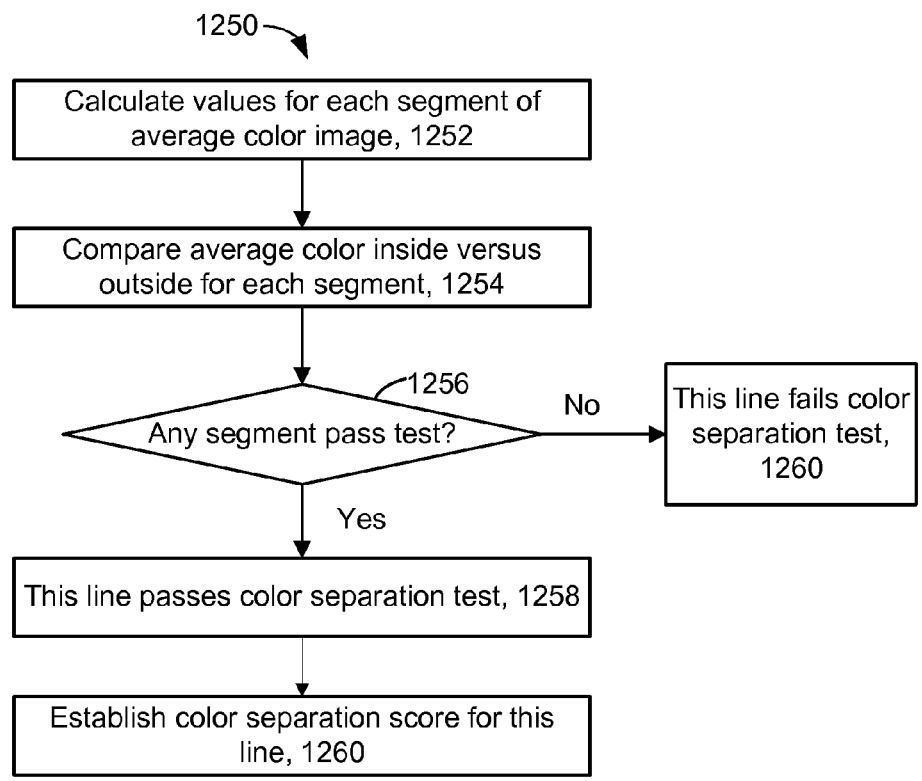
FIG. 12B is a flowchart of one embodiment of an average color test for one candidate line.

FIG. 12B is a flowchart of one embodiment of an average color test for one candidate line (e.g., top, bottom, left, right). In step 1252, values for each segment 1206 of the average color image 1202 are determined. This includes at least one segment inside the screen and at least one segment outside of the screen. This calculation can be made in a number of ways. In one embodiment, there is a red, green, and blue color band for the action image. That is, there is an average red value, an average green value, and an average blue value. In such a case, there can three values determined for each segment. As another possibility, these one value could be determined for the combination of these three color bands. In one embodiment, the average color image 1202 is converted to a grey level image, similar to how the variance image was converted to a grey level image.

In step 1254, average color values inside the candidate line are compared with average color values outside of the candidate line. The goal to determine whether there is a significant difference in the average color inside the screen versus outside, in one embodiment.

Step 1254 proceeds on a segment by segment basis, in one embodiment. For example, segment $I_{11}$ is compared with $I_{12}$, etc. In one embodiment, there is also a test that combines all of the segments. For example, an average color value may be determined for the combination of $I_{11}, I_{12}, I_{13}$ (e.g., by adding average color values for each segment). This may be compared with an average color value for the combination of $I_{21}$, $I_{22}, I_{23}$.

In step 1256, a determination is made whether any of the segment comparisons passed. The following equation may be used in a possible test that could be performed.

$$R_j = \left(\frac{R_{1j}+\varepsilon}{R_{2j}+\varepsilon}\right) \times \left(\frac{G_{1j}+\varepsilon}{G_{2j}+\varepsilon}\right) \times \left(\frac{B_{1j}+\varepsilon}{B_{2j}+\varepsilon}\right) \quad (36)$$

Equation 36 forms a single value based on the red, blue, and green bands. In Equation 36, the subscript "1" represents a segment inside the candidate screen 1104, and the subscript "2" represents a segment outside the candidate screen 1104. A value of $R_j$ may be determined for each of the segments. Also, a single value of $R_j$ may be determined for the combination of all segments. The subscript "j" represents the segment. Epsilon is a small number to account for dark regions where the RGB values get close to zero and ratios can explode.

After $R_j$ is determined for a given segment, it may be compared to some threshold. As one example, the test passes if $R_j$ is greater than two for any of the segments.

Another possible test subtracts the average color values outside the screen from the average color values inside the screen. This may be performed on a segment by segment basis. In one embodiment, a line passes if the difference is greater than a threshold. For example, the maximum possible average color might be 255. The test might pass if the difference is greater than 100.

In one embodiment of either the $R_j$ or average color subtraction test passes for a segment, then that segment passes. In one embodiment, if a single segment passes, then the candidate line passes.

Step 1258 is to note that this candidate line passed. Step 1260 is to establish a score for this line. A variety of techniques can be used. In one embodiment, the score is based on the difference in average color values inside the screen and outside the screen. As noted, the score could be determined based on subtracting the average color values outside from those inside. The process 1250 may be repeated for other candidate lines. In one embodiment, all four lines need to pass for the candidate screen to pass the color separation test.

In one embodiment, a total average color score for the screen is determined based on the average color score for each line. One possibility is to add the average color scores for the four candidate lines. Many other techniques are possible for forming a scored based on a comparison of the values of the average color inside the screen candidate with the values of the average color outside the screen candidate.

In one embodiment, a score is determined based on a combination of the average color score and the action separation score. As one example, these two scores are multiplied by each other. In one embodiment, this score is considered to be the final score for the average color separation score.

Step 1160 is to note that this candidate line failed. Note that failure could be defined in another manner, such as not enough of the segments passing.

Color Symmetry Test

Figure 13A:
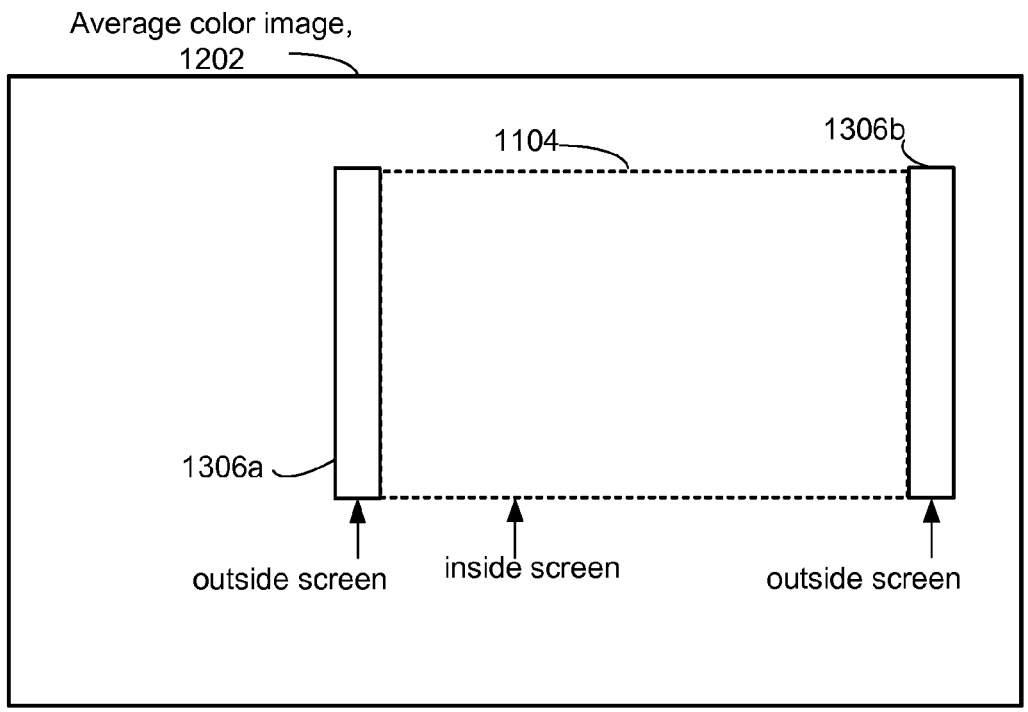
FIG. 13A and FIG. 13B each show an average color image having a candidate screen to help illustrate one embodiment of a color symmetry test.

One embodiment is a color symmetry test. FIG. 13A shows an average color image 1202 having a candidate screen 1104 to help illustrate this test. Region 1306a is a region just outside of the candidate screen 1104 on the left side. Region 1306b is a region just outside of the candidate screen 1104 on the right side. These regions 1306a, 1306b might each be one, two, three, four, etc. pixels wide. In one embodiment of the color symmetry test, region 1306a is compared with region 1306b to determine whether their average color is about the same. A motivation behind this test is to look for a screen frame. Typically, the screen frame will have the same color on each side. The following two equations may be used in one embodiment of the color symmetry test.

$$I_{out}^{left} - I_{out}^{right} < Tc1 \quad (37)$$

$$\frac{\langle I_{out}^{left}, I_{out}^{right} \rangle}{|I_{out}^{left}||I_{out}^{right}|} > Tc2 \quad (38)$$

In these equations, $I_{out}^{left}$ refers to region 1306a and $I_{out}^{right}$ refers to region 1306b. Equation 37 may perform a subtraction of one region from the other. In one embodiment, this test is applied separately to each color band. In one embodiment, the different color bands are combined such as, for example, by forming a grey level image. This test for a given band may form a single value for the entire region 1306a, 1306b such as, for example, by summing the values of the pixels for that color band (and possibly normalizing). However other possibilities exist for the subtraction operation.

Equation 38 may take the inner product of the two regions. Note that average color image 1202 may be a vector in that it may have three color bands. Equation 38 may determine the angle between these two vectors. In one embodiment, this is to test whether the angle between these two vectors is sufficiently small. Note that the threshold Tc2 may be a value between 0 and 1, where a value of 1 indicates a small angle. Thus, Tc2 could be some value that is less than, but close to, 1.

The scored for the color symmetry test may be determined based on equation 37 and/or equation 38. In one embodiment, the value from equation 37 and/or equation 38 is adjusted by, for example, multiplying by a constant.

Figure 13B:
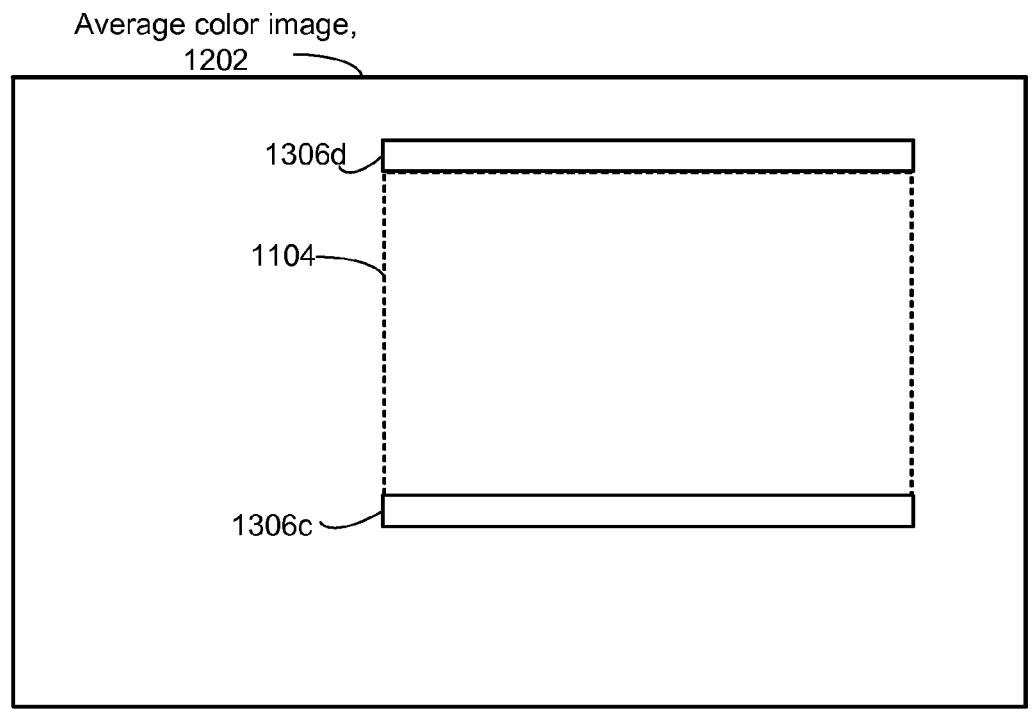

The color symmetry test may also be applied to the top and the bottom of the candidate screen. FIG. 13B shows average color image 1202 having a candidate screen 1104 to help illustrate this test. Region 1306c is a region just outside of the candidate screen 1104 on the bottom side. Region 1306d is a region just outside of the candidate screen 1104 on the top side. Analysis may be similar to the previous example and will not be discussed in detail.

Color Uniformity of Screen Boundaries Test

One embodiment is a color uniformity of screen boundaries test. A reason behind this test is that for many screens, there is a frame (or other element) at the screen boundary that may be expected to be uniform in color. For example, along the top boundary of the screen it may be expected that there may spatial uniformity in color. In one embodiment, this test is applied to four boundaries of the screen (e.g., top, bottom, right, left).

Figure 14:
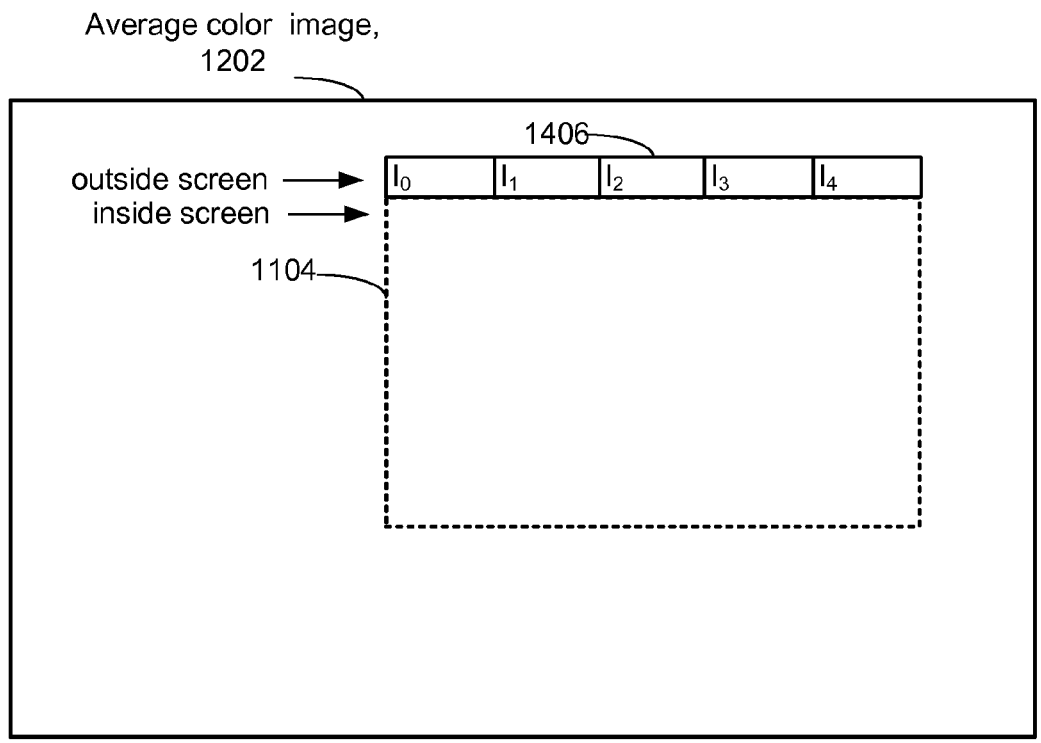
FIG. 14 is a diagram of an example average color image with a screen candidate to help facilitate explanation of one embodiment of a uniformity of color of screen boundary test.

FIG. 14 shows an average color image 1202 having a candidate screen 1104. Five segments $I_0$, $I_1$, $I_2$, $I_3$, $I_4$ in the average color image 1202 that are just above the top of the candidate screen 1104 are shown (segment $I_2$ is referenced as 1406). There may be more or fewer than five segments. Each segment 1406 occupies a certain "band" that may be one or more pixels in height, in this example. For a test of the right or left side, the band may be one or more pixels wide.

In one embodiment, spatially adjacent segments 1406 are compared with each other. For the sake of discussion, these adjacent segments 1406 will be referred to as $I_j$ and $I_{j+1}$. This test determines whether the average color in the adjacent segments 1406 is similar. Numerous possible tests could be performed. The following is one possible test.

$$\frac{I_{j+1}}{I_j} \cong 1 \tag{39}$$

The test of equation 39 determines whether the ratio of the average color in the adjacent segments is close to 1. This test may be performed on each pair of adjacent segments 1406. The average color image 1202 may have three color bands. In this case, the test of equation 39 could be applied separately to each color band. Another option is to form a single average "color" for the three bands. This might include determining a grey level for the average color image, similar to Equation 12.

In one embodiment, all segment pairs (for a given boundary) should pass for the test to pass for that boundary. The test may be repeated for other boundaries. In one embodiment, all boundaries should pass the test for the screen candidate to pass the color uniformity of screen boundaries test.

Another possible test is based on a normalized inner product as follows.

$$\frac{\langle I_j, I_{j+1}\rangle}{\sqrt{\langle I_j, I_j\rangle * \langle I_{j+1}, I_{j+1}\rangle}} > CU \tag{40}$$

In Equation 40, CU is a threshold. An example value for CU is something just under 1.0, such as about 0.94. This is just an example, the threshold could be higher or lower. The numerator is the inner product of two adjacent segments 1406 in the average color image. As discussed above, those segments 1406 may be at a screen boundary. The segments 1406 are just outside the candidate screen in one embodiment. The denominator has two inner products, as shown.

In one embodiment, the test of Equation 40 is combined with an additional requirement that each of the segments $I_j$, $I_{j+1}$ should be darker than a specified parameter. For example, this parameter could specify that a region has a certain level of darkness.

In yet another embodiment, a segment pair $I_j$, $I_{j+1}$ should pass either the test of Equation 39 or Equation 40 for that segment pair to pass. In still another embodiment, a segment pair $I_j$, $I_{j+1}$ should pass either the test of Equation 39 or pass both the test of Equation 40 and the aforementioned darkness test for that segment pair to pass.

The foregoing are examples of color uniformity of screen boundaries test. Other possibilities exist for testing the color uniformity of boundaries of a candidate screen.

Strength of Corners Test

Figure 15A:
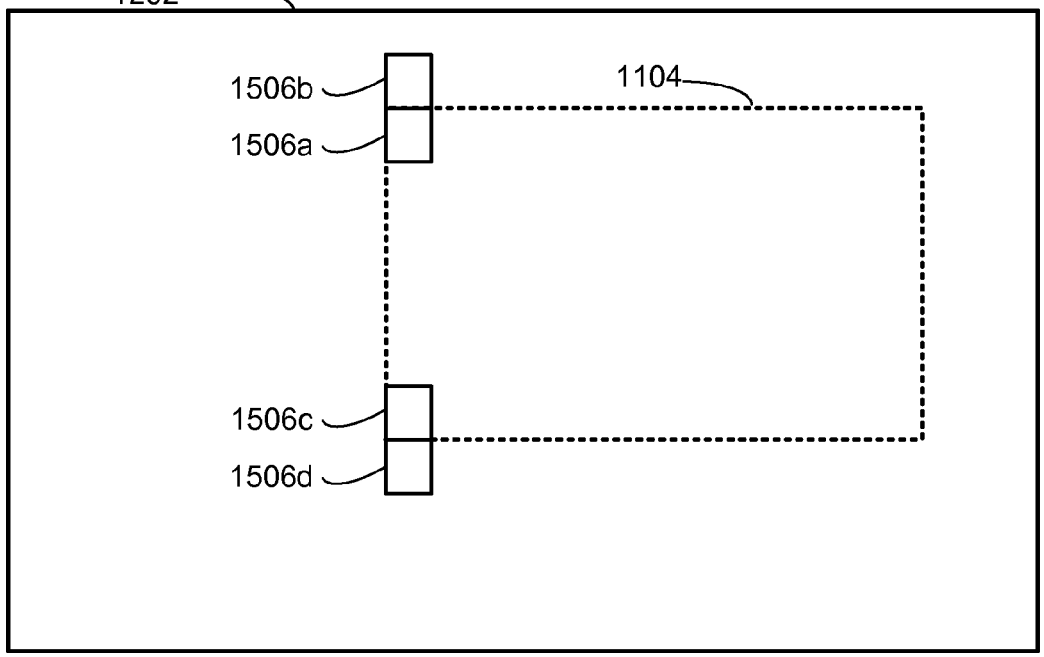
FIGS. 15A and 15B are diagrams of an example average color image with a screen candidate to help facilitate explanation of one embodiment of a strength of corners test.
Figure 15B:
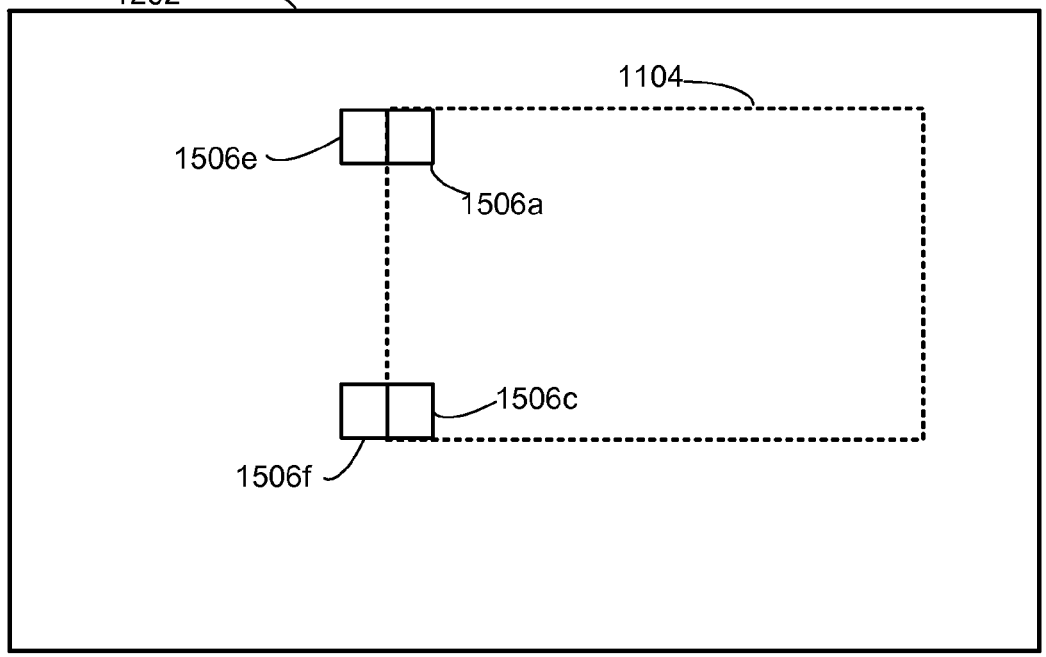

One embodiment is a strength of corners test. FIGS. 15A and 15B are diagrams of an example average color image 1202 with a screen candidate 1104 to help facilitate explanation of one embodiment of a strength of corners test. One embodiment of a strength of corners test tests for differences in color at the corner of the screen candidate 1104. One motivation behind this test is that a good screen may exhibit "strong" corners. A strong corner may be defined as one in which the average color changes sharply at the screen corner.

In FIG. 15A regions $I_1$ 1506a, $I_2$ 1506b, $I_3$ 1506c, and $I_4$ 1506d are depicted. Regions $I_1$ 1506a and $I_3$ 1506c are just inside the candidate screen 1104, at a corner junction. Regions $I_2$ 1506b and $I_4$ 1506d are just outside the candidate screen 1104, at the corner junction. The average color of region $I_1$ 1506a may be compared region $I_2$ 1506b. Likewise, the average color of region $I_3$ 1506c may be compared region $I_4$ 1506d. With respect to FIG. 15B, the average color of region $I_1$ 1506a may be compared region $I_5$ 1506e. Likewise, the average color of region $I_3$ 1506c may be compared region $I_6$ 1506f.

The following two equations may be used for one possible test for the regions in FIGS. 15A and 15B.

$$I_2 - I_1 > CT1 \text{(see e.g., FIG. 15A)} \tag{41}$$

AND $$I_5 - I_1 > CT1 \text{(see e.g., FIG. 15B)} \tag{42}$$

In one embodiment, a corner is characterized by the fact that the interior region (e.g., $I_1$ 1506a in FIG. 15A) is different from two different exterior regions (e.g., $I_2$ 1506b in FIG. 15A and $I_5$ 1506e in FIG. 15B). Similar reasoning can be applied to the other corners. The following applies to the lower left corner.

$$I_4 - I_3 > CT1 \text{(see e.g., FIG. 15A)} \tag{43}$$

AND $$I_6 - I_3 > CT1 \text{(see e.g., FIG. 15B)} \tag{44}$$

In these equations, CT1 is a threshold designed to test for a significant color change.

Aspect Ratio Test

One embodiment is an aspect ratio test. This tests whether the aspect ratio of the candidate screen is reasonable. The following is one possible equation to use.

$$AR1 \le \frac{w}{H} \ge AR2 \tag{45}$$

In Equation 45, the ratio is given by the width divided by the height, as defined by the lines of the screen candidate. As one example, AR1 may be about 1.1 and AR2 may be about 3.5. Each value could be higher or lower. Note that the screen might not be facing the camera such that its surface is perpendicular to the camera's image axis. This could impact the aspect ratio. One option is to attempt to compensate for this less than ideal alignment of the candidate screen prior to the aspect ratio test. In this case, different values for AR1 and AR2 might be used when working with uncompensated data.

Scoring Screen Candidates

Figure 16:
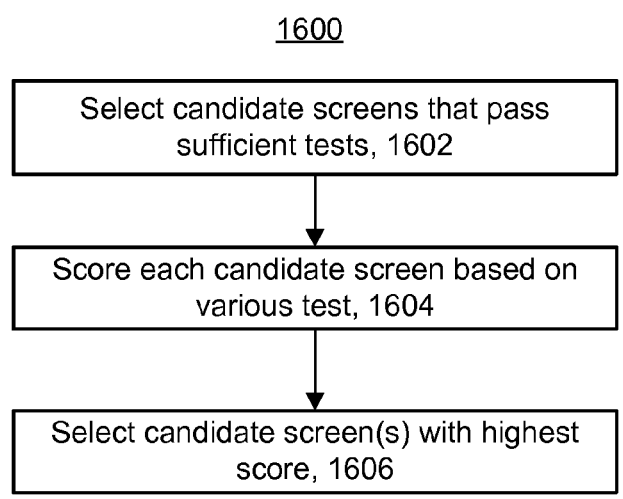
FIG. 16 is a flowchart of one embodiment of scoring screen candidates based on various tests.

FIG. 16 is a flowchart of one embodiment of scoring screen candidates based on various tests. In step 1602, screen candidates that pass sufficient tests are selected for further processing. In one embodiment, those screen candidates that pass either: 1) the action separation test and the aspect ratio test; or 1) the color separation test and the aspect ratio test are selected. However, a different set of tests could be used. For example, in one embodiment, it is not required that the aspect ratio test be passed.

In step 1604, the screens that passed the filter of step 1602 are scored using various tests. Any combination of the tests described herein could be used. Thus, the score may be based on one or more of: action separation test, color separation test, color symmetry test, color uniformity of screen boundaries test, and/or strength of corners test. In one embodiment, all of these tests are used. In various embodiments, at least two, at least three, or at least four of the tests are used. In one embodiment, a score from the aspect ratio test is not used in step 1604. However, one option is to score the aspect ratio test and use it in step 1604.

In step 1606, the screens are ranked by their scores. The top K-candidates having the highest scores are selected as being a potential screen for further processing, in one embodiment. "K" is one or more. Thus, a screen such as a display screen, computer monitor, image projector, street sign, electronic bulletin board, etc. may be located in the image data. Once the screen is detected, further processing may be performed. This could include Automatic Content Recognition of TV and video content, augmented reality experience to merge screen content and virtual objects, reading dynamic street signs, transmitting and syncing messages through large electronic bulletin boards, recognizing the identity of an exhibition in museums or other show rooms, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    forming a processing image based on corresponding pixels in a plurality of frames of image data, the processing image comprising values corresponding to the pixels in the plurality of frames;
    identifying a set of lines in the plurality of frames that are candidate for boundaries of a screen;
    for each line in the set, comparing the values in the processing image along one side of the line with the values in the processing image along the other side of the line, including forming a first running total of the values in the processing image along one side of at least a portion of the line and a second running total of the values in the processing image along the other side of the at least a portion of the line, and comparing a value in the first running total with the corresponding value in the second running total;
    forming a set of screen candidates based on the comparison of the first running total with the second running total for each line in the set;
    scoring screens in the set of screen candidates according to a criterion; and
    selecting a first of the screens in the set of screen candidates based on the scoring as a potential screen.

2. The method of claim 1, wherein the forming a processing image based on corresponding pixels in a plurality of frames of image data comprises:
    forming an action image based on differences between corresponding pixels in two or more of the plurality of frames of image data.

3. The method of claim 1, wherein the forming a processing image based on corresponding pixels in a plurality of frames of image data comprises:
    forming an average color image based on average color of corresponding pixels in the plurality of frames of image data.

4. The method of claim 1, further comprising:
    detecting a rough region of the screen in the plurality of frames, including:
    generating a reduced resolution version of an image in the plurality of frames of image data;
    calculating a variance image from the reduced resolution version of the image; and
    estimating vertical and horizontal boundaries of the screen from the variance image, including determining a region of the variance image that includes high action.

5. The method of claim 1, wherein the scoring screens in the screen candidates according to a criterion includes:
    comparing a portion of the processing image that is inside of a candidate screen with a portion of the image that is just outside of the candidate screen.

6. The method of claim 1, wherein the scoring screens in the screen candidates according to a criterion includes:
    comparing two portions of the processing image that are just outside of a candidate screen, but on opposites sides of the candidate screen.

7. A system comprising:
    a camera that is configured to generate frames of image data;
    a processor in communication with the camera and that is configured to:
    form a processing image based on corresponding pixels in a plurality of the frames of image data, the processing image comprising values corresponding to the pixels in the plurality of frames;
    identify a set of lines in the plurality of frames that are candidate for boundaries of a screen;
    for each line in the set, form a first running total of values in the processing image in a first portion along one side of the line and a second running total of values in the processing image in a second portion along the other side of the line, wherein the first portion is adjacent to the second portion, and compare a value in the first running total with the corresponding value in the second running total;
    form a set of screen candidates based on the comparison of the first running total with the second running total for each line in the set;
    score screens in the screen candidates according to a criterion; and
    select a first of the screens in the set of screen candidates based on the scoring.

8. The system of claim 7, wherein the processor being configured to form a processing image based on corresponding pixels in a plurality of frames of image data includes the processor being configured to form an action image based on differences between corresponding pixels in two or more of the plurality of frames of image data.

9. The system of claim 7, wherein the processor being configured to form a processing image based on corresponding pixels in a plurality of frames of image data includes the processor being configured to form an average color image based on average color of corresponding pixels in the plurality of frames of image data.

10. The system of claim 7, wherein the processor further detects a rough region of the screen in the plurality of frames, including the processor being configured to:
generate a reduced resolution version of an image in the plurality of frames of image data;
calculate a variance image from the reduced resolution version; and
estimate vertical and horizontal boundaries of the screen from the variance image, including determining a region of the variance image that includes high action.

11. The system of claim 7, wherein the processor being configured to score screens in the screen candidates according to a criterion includes the processor being configured to compare a portion of the processing image that is inside of a candidate screen with a portion of the processing image that is just outside of the candidate screen.

12. The system of claim 7, wherein the processor being configured to score screens in the screen candidates according to a criterion includes the processor being configured to compare two portions of the processing image that are just outside of a candidate screen, but on opposites sides of the candidate screen.

13. The system of claim 7, wherein the processor being configured to score screens in the screen candidates according to a criterion includes the processor being configured to determine whether a candidate screen passes either a color separation test or an action separation test, the color separation test compares an average color of the processing image just inside of a candidate screen with an average color of the processing image just outside of the candidate screen, the action separation test compares action in the processing image just inside of the candidate screen with action of the processing image just outside of the candidate screen.

14. The system of claim 7, wherein the set of lines in the plurality of frames comprises multiple lines in a single one of the frames.

15. The system of claim 7, wherein the processor is further configured to:
determine a new first portion and a new second portion for a first of the lines in the set; and
re-calculate the first running total and the second running total for the new first portion and the new second portion, including the processor being configured to modify the original first running total and the original second running total based on a running total of values along the line that were not used when determining the original first running total and the original second running total.

16. A computer-readable storage device having computer-readable instructions embodied thereon for use by a processor, the computer-readable instructions cause the processor to:
access a plurality of frames of image data;
form an action image based on differences between corresponding pixels in two or more of the plurality of frames of image data, the action image comprising action values corresponding to pixels in the frames of image data;
select a set of lines in the plurality of frames that are candidates for boundaries of a screen;
for each selected line: a) move along the selected line to form a first running total of action values in the action image along a first side of the selected line and a second running total of action values along a second side of the selected line, and b) compare an action value in the first running total with an action value for a corresponding pixel location in the second running total;
form a set of screen candidates based on the comparison of the first and second running totals for each selected line;
score screens in the screen candidates according to a criterion; and
select a first of the screens in the set of screen candidates as a potential screen based on the scoring.

17. The computer-readable storage device of claim 16, wherein the processor being configured to score screens in the screen candidates according to a criterion includes the processor being configured to determine whether a candidate screen passes an action separation test, the action separation test compares action in the action image just inside of the candidate screen with action of the action image just outside of the candidate screen.

18. The computer-readable storage device of claim 16, wherein the instructions further cause the processor to form an average color image based on average color of corresponding pixels in the plurality of frames of image data, wherein the instructions that cause the processor to score screens in the screen candidates according to a criterion cause the processor to compare a portion of the average color image that is just inside of a candidate screen at a corner junction with both a first region and a second region that are just outside of the candidate screen at the corner junction.

19. The computer-readable storage device of claim 16, wherein the instructions further cause the processor to form an average color image based on average color of corresponding pixels in the plurality of frames of image data, wherein the instructions that cause the processor to score screens in the screen candidates according to a criterion that cause the processor to compare color uniformity at boundaries of a candidate screen based on the average color image.

20. The computer-readable storage device of claim 16, wherein the instructions further cause the processor to form an average color image based on average color of corresponding pixels in the plurality of frames of image data, wherein the instructions that cause the processor to score screens in the screen candidates according to a criterion that cause the processor to compare a first portion of the average color image that is just outside of a candidate screen on one side with a second portion of the average color image that is just outside of the candidate screen on the opposite side, the processor compares the first portion and the second portion for color symmetry.

* * * * *